United States Patent
Di Maria

(10) Patent No.: US 8,573,605 B2
(45) Date of Patent: Nov. 5, 2013

(54) ACTIVE SUSPENSION SYSTEM AND HYDRAULIC RAM THEREFOR

(76) Inventor: Phillip Di Maria, Victoria (AU)

( * ) Notice: Subject to any disclaimer, the term of this patent is extended or adjusted under 35 U.S.C. 154(b) by 78 days.

(21) Appl. No.: 13/201,756

(22) PCT Filed: Feb. 16, 2010

(86) PCT No.: PCT/AU2010/000166
§ 371 (c)(1),
(2), (4) Date: Jan. 26, 2012

(87) PCT Pub. No.: WO2010/091481
PCT Pub. Date: Aug. 19, 2010

(65) Prior Publication Data
US 2012/0119454 A1    May 17, 2012

(30) Foreign Application Priority Data

Feb. 16, 2009 (AU) ................................ 2009900645

(51) Int. Cl.
*B60G 17/08* (2006.01)
*F16F 9/34* (2006.01)
*F16F 9/504* (2006.01)

(52) U.S. Cl.
USPC ............... 280/5.506; 280/124.16; 280/5.515; 188/313; 188/283; 188/316; 188/319.1; 188/320; 188/282.1; 188/282.5; 188/282.8; 188/322.15

(58) Field of Classification Search
USPC ............ 280/5, 5.506–5.508, 5.515, 124.106, 280/124.16
See application file for complete search history.

(56) References Cited

U.S. PATENT DOCUMENTS

| 2,732,039 | A | * | 1/1956 | Funkhouser et al. | 188/282.6 |
| 3,302,756 | A | * | 2/1967 | Mcintyre | 188/315 |
| 3,706,362 | A | | 12/1972 | Faure | |
| 3,756,357 | A | * | 9/1973 | Graff et al. | 188/282.6 |
| 3,981,380 | A | * | 9/1976 | Andre | 188/282.9 |
| 4,497,394 | A | * | 2/1985 | Ferrand et al. | 188/322.15 |
| 5,251,927 | A | * | 10/1993 | Charles et al. | 188/319.1 |
| 5,392,883 | A | * | 2/1995 | Huang et al. | 188/282.3 |
| 7,395,907 | B2 | * | 7/2008 | de Kock et al. | 188/322.15 |
| 7,954,609 | B2 | * | 6/2011 | Chikamatsu et al. | 188/280 |
| 2009/0057079 | A1 | * | 3/2009 | Vanbrabant | 188/313 |

FOREIGN PATENT DOCUMENTS

| GB | 2072302 A | 9/1981 |
| WO | WO 00/69664 A1 | 11/2000 |

OTHER PUBLICATIONS

International Search Report issued in International Application No. PCT/AU2010/000166, dated Apr. 22, 2010.
Written Opinion issued in International Application No. PCT/AU2010/000166, dated Apr. 22, 2010.
International Preliminary Report on Patentability issued in International Application No. PCT/AU2010/000166, dated Aug. 16, 2011.

* cited by examiner

*Primary Examiner* — Ruth Ilan
(74) *Attorney, Agent, or Firm* — McCarter & English, LLP

(57) ABSTRACT

An active suspension system for a vehicle including at least one fluid operated ram having a cylinder and a main piston mounted therein for reciprocating movement, control means for controlling an equilibrium position of the piston in the ram in response to lateral acceleration of the vehicle in order to counter the effects of body roll of the vehicle, and wherein the ram includes shock absorbing means for permitting rapid movement of the piston from the equilibrium position when operating fluid in the ram is subjected to transient increases in pressure.

22 Claims, 30 Drawing Sheets

FIGURE 1
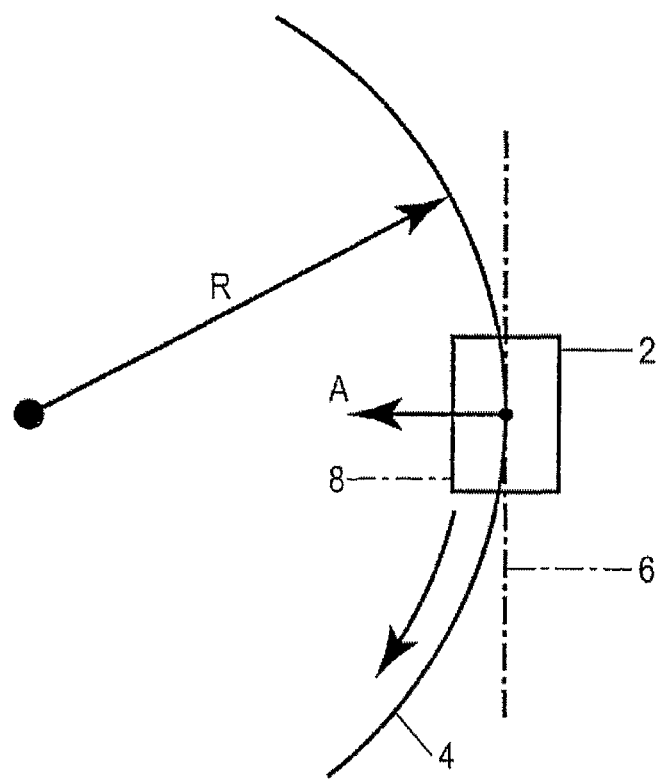
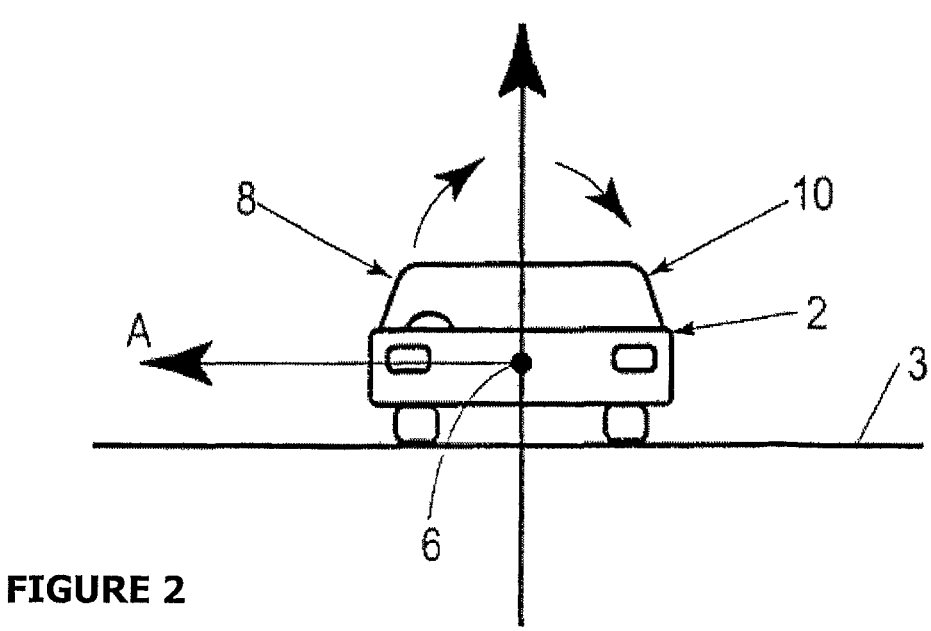
FIGURE 2

SECTION 15-15

SECTION 16-16

SECTION 17-17

SECTION 19-19

SECTION 20-20

SECTION 21-21

SECTION 22-22

SECTION 23-23

SECTION 24-24

SECTION 25-25

ACTIVE SUSPENSION SYSTEM AND HYDRAULIC RAM THEREFOR

RELATED APPLICATIONS

This application is a 35 U.S.C. §371 national stage filing of International Application No. PCT/AU2010/000166, filed on Feb. 16, 2010 and claims the benefit of Australian Patent Application No.: 2009900645, filed on Feb. 16, 2009. The entire contents of each of the foregoing applications are incorpoated herein by reference.

This invention relates to an active suspension system and components therefor including a fluid operated ram.

BACKGROUND

Active suspension systems are known. Generally speaking the object of such systems is to counteract the effect of body roll which is caused by lateral acceleration when cornering.

An object of the invention is to provide an improved active suspension system for a vehicle.

Another object of the invention is to provide a fluid operated ram for use in an active control system for a vehicle.

Another object of the invention is to provide a shock absorber having adjustable stiffness.

Another object of the invention is to provide a fluid operated ram which is capable of supporting a load by having a pressure differential across its piston and which enables damping movements of the piston to take place in response to transient increases in pressure whilst still being able to support the load.

SUMMARY OF THE INVENTION

In accordance with one aspect of the present invention, there is provided an active suspension system for a vehicle including at least one fluid operated ram having a cylinder and a main piston mounted therein for reciprocating movement, control means for controlling an equilibrium position of the piston in the ram in response to lateral acceleration of the vehicle in order to counter the effects of body roll of the vehicle, the ram including shock absorbing means including upper and lower internal sealing members mounted within the main piston for permitting rapid movement of the piston from said equilibrium position when operating fluid in the ram is subjected to transient increases in pressure, wherein the main piston includes a main body, and upper and lower parts fitted to the main body, the upper internal sealing member fitted to rest in a sealing configuration against an inner surface of the upper part and being arranged such that an upper surface thereof is in direct communication with an upper working chamber above the main piston and a lower surface thereof is in direct communication with a lower working chamber below the main piston, the lower internal sealing member fitted to rest in a sealing configuration against an inner surface of the lower part and being arranged such that an upper surface thereof is in direct communication with the upper working chamber and a lower surface thereof is in direct communication with the lower working chamber, whereby a transient increase in pressure in the upper working chamber causes the upper internal sealing member to move away from said sealing configuration against the upper part to allow fluid to flow from the upper working chamber to the lower working chamber, and a transient increase in pressure in the lower working chamber causes the lower internal sealing member to move away from said sealing configuration against the lower part to allow fluid to flow from the lower working chamber to the upper working chamber.

An hydraulic ram which can be used as an adjustable shock absorber, said ram having a cylinder, a main piston mounted on a piston rod and defining upper and lower working chambers in the cylinder;

the ram including shock absorbing means including upper and lower internal sealing members mounted within the main piston for permitting rapid movement of the piston from said equilibrium position when operating fluid in the ram is subjected to transient increases in pressure, wherein the main piston includes a main body, and upper and lower parts fitted to the main body, the upper internal sealing member fitted to rest in a sealing configuration against an inner surface of the upper part and being arranged such that an upper surface thereof is in direct communication with the upper working chamber above the main piston and a lower surface thereof is in direct communication with the lower working chamber below the main piston, the lower internal sealing member fitted to rest in a sealing configuration against an inner surface of the lower part and being arranged such that an upper surface thereof is in direct communication with the upper working chamber and a lower surface thereof is in direct communication with the lower working chamber, and wherein a control fluid duct is provided in said piston rod in communication with passages in the main piston to provide fluid communication between said fluid control duct and upper and lower pressure relief pistons mounted within an internal cylinder of the main body to exert sealing force against the upper and lower sealing members, wherein the arrangement is such that hydraulic fluid supply means can be used to supply operating fluid at a high pressure and a low pressure to said upper and lower working chambers whereby the pressure difference across the main piston enables the ram to support a load and wherein the high pressure is, in use, applied to said control fluid duct so that the upper and lower sealing members are in a sealed configuration but, if a transient increase of fluid pressure is caused in the upper working chamber the upper internal sealing member is transiently displaced from said sealing configuration against the upper part to allow fluid to flow from the upper working chamber to the lower working chamber, and if a transient increase of fluid pressure is caused in the lower working chamber the lower internal sealing member is transiently displaced from said sealing configuration against the lower part to allow fluid to flow from the lower working chamber to the upper working chamber.

BRIEF DESCRIPTION OF THE DRAWINGS

The invention will now be further described with reference to the accompanying drawings, in which:

FIG. 1 is a schematic view of the vehicle turning on a circular path;

FIG. 2 is a schematic view of a front view of the vehicle;

DETAILED DESCRIPTION OF THE PREFERRED EMBODIMENTS

Figure 3:
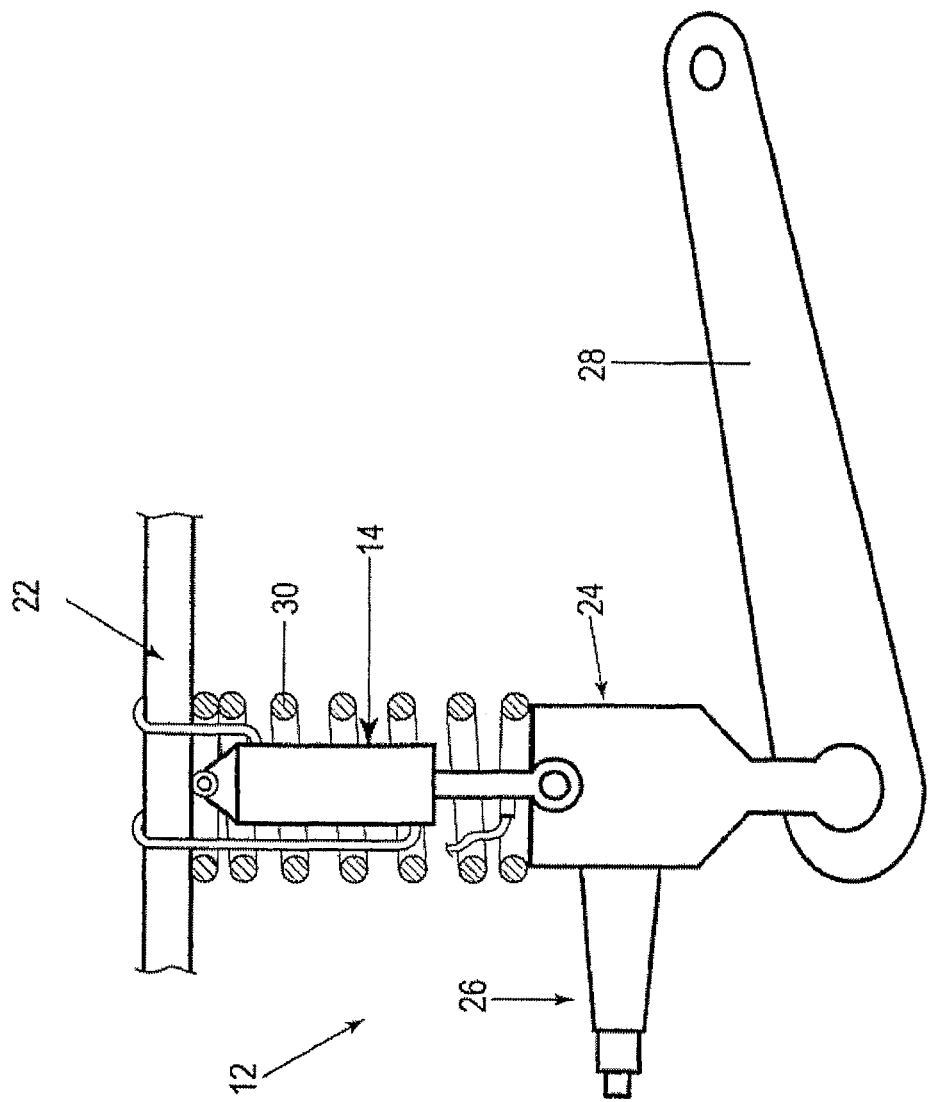
FIG. 3 is a schematic view of part of an active suspension system.

FIGS. 1 and 2 show a vehicle 2 travelling in a circular path 4 of radius R. The vehicle will be subjected to a centrifugal acceleration A which is proportional to $V^2/R$ where V is velocity of vehicle. The acceleration tends to rotate the vehicle about an axis 6 which is generally horizontal and tangential to the circular path 4, the inner side 8 of the vehicle tending to lift whereas the outer side 10 of the vehicle tending to move closer to the road 3. The vehicle 2 has an active suspension system 12 which tends to counteract the body roll. Thus, on cornering, the active suspension system 12 tends to raise the side of the vehicle on the outside of the turn and lower the vehicle on the inner side of the turn, as will be explained hereinafter.

Figure 4:
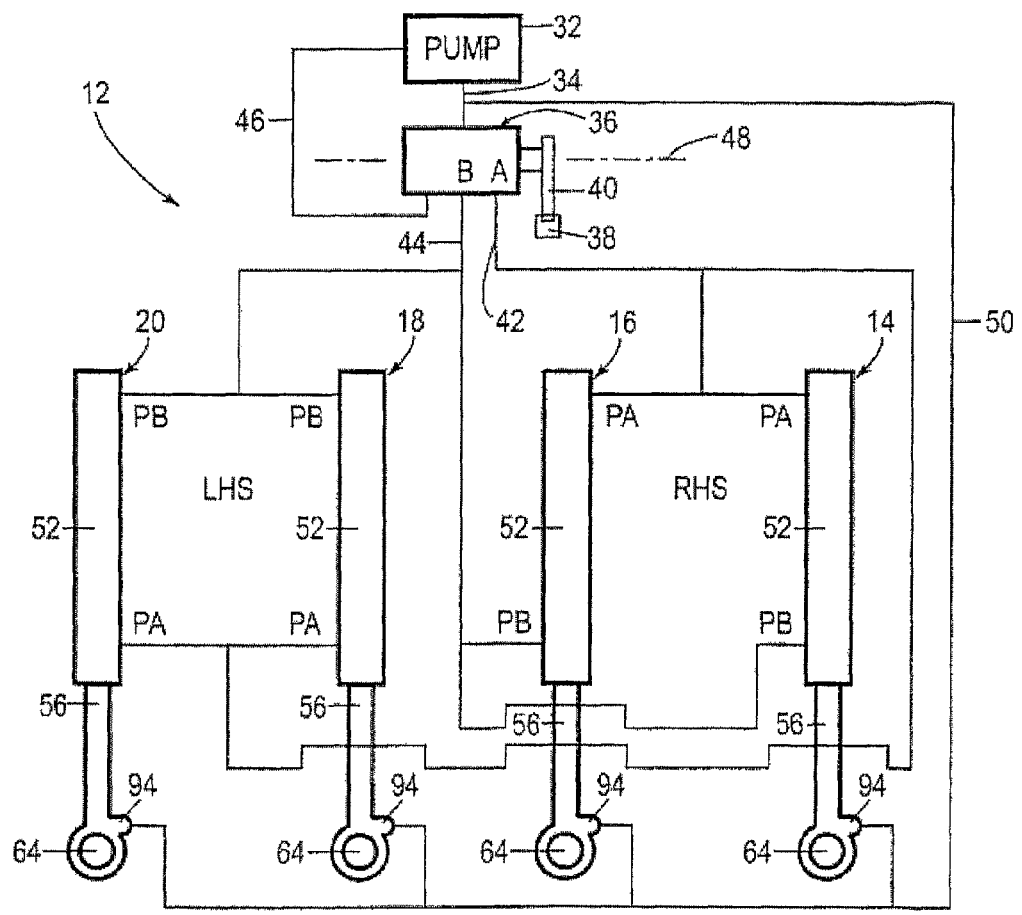
FIG. 4 is a schematic view of the active suspension system.

FIGS. 3 and 4 are schematic views which illustrate the principles of the active suspension system. The system includes four double-acting hydraulic rams 14, 16, 18 and 20. Each of these rams is associated with one of the wheels (not shown) of the vehicle 2. The rams 14 and 16 are associated with the front and rear wheels on the right hand side of the vehicle and the rams 18 and 20 are associated with the front and rear wheels on the left hand side of the vehicle. The rams 14, 16, 18 and 20 replace shock absorbers which would normally be provided in a vehicle suspension. FIG. 3 diagrammatically shows the ram 14 connected between the vehicle chassis 22 and an axle assembly 24 which includes an axle 26 upon which the front right hand side wheel of the vehicle is mounted. The axle assembly 24 is coupled to a drop arm 28, one end of which is typically pivotally connected to the chassis 22 of the vehicle. A coil spring 30 acts between the chassis 22 and the axle assembly 24, in the usual way. Conveniently the ram 14 is located within the coil spring 30. The other rams can be mounted in the same or similar way.

FIG. 4 schematically illustrates the hydraulic control system for operating the rams 14, 16, 18 and 20. The system includes an hydraulic pump 32 having an outlet line 34 which is coupled to an inlet of a control valve 36. The control valve 36 is coupled to a pendulum which includes a pendulum mass 38 and pendulum arm 40. The control valve 36 can be identical to that disclosed in WO 94/02767 and the content of that publication is incorporated herein by reference. The control valve 36 has outlet lines 42 and 44 and a return line 46 which may include an hydraulic fluid tank (not shown). The control valve 36 is mounted on the vehicle such that the axis 48 of the pendulum arm 40 is oriented in the longitudinal direction of the vehicle (i.e. parallel to the axis 6 shown in FIG. 1). When the vehicle turns, the pendulum arm will swing to the left or right according to the direction of the turn. The control valve 36 causes the pump 32 to produce a relatively high pressure on its outlet line 34 which is also present at one of the outlets of the valve 36, the other outlet remaining at the relatively low return pressure of the return line 46 to the pump. Generally speaking, hydraulic lines are connected from the outlets of the control valve 36 to the rams 14, 16, 18 and 20 but in an opposite configuration on the left hand and right hand sides of the vehicle. More particularly, the outlet line 42 is connected to the tops of the rams 14 and 16 but to the bottoms of the rams 18 and 20. Similarly, the outlet line 44 is coupled to the tops of the rams 18 and 20 but to the bottoms of the rams 14 and 16. The system includes a control line 50 which is connected from the outlet line 34 of the pump to pistons of the rams as will be described in more detail below.

The operation of the active control suspension is as follows. When the vehicle 2 is moving in a straight line, the valve 36 effectively causes the outlet line 34 of the pump to be coupled to the return line 46. Thus the outlet pressure of the pump is relatively low, say 15 psi. When, however, the vehicle turns left, the pendulum operates on the valve 36 so as to cause an increase in pressure at outlet 42 whilst the pressure at outlet 44 remains at the pump return pressure. This causes the rams 14 and 16 on the right hand side of the vehicle to elongate and the rams 18 and 20 on the left hand side of the vehicle to contract. Because of the coupling of the rams between the axle assemblies and the chassis, the right hand side of the vehicle is raised and the left hand side of the vehicle is lowered thereby countering the effect of body roll.

The valve 36 produces output pressure on its outlet 42, the magnitude of which is generally proportional to the lateral acceleration of the vehicle as described in WO 94/02767 referred to above. This causes the magnitude of the raising and lowering of the body of the vehicle to be proportional to angular velocity as required. In practice, the rams will move to an equilibrium position which is determined chiefly by the magnitude of the lateral acceleration, the weight of the vehicle and the characteristics of the springs 30.

The opposite happens when the vehicle turns towards the right. In this case the control valve 36 operates to elongate the rams 18 and 20 on the left hand side of the vehicle and contract the rams 14 and 16 on the right hand side of the vehicle. Again the degree of raising and lowering is proportional to the lateral acceleration.

Whilst the active suspension system described above is effective for countering the effects of body roll, it will be appreciated that the rams 14, 16, 18 and 20 would, unless special provision is made, effectively mean that there would not be any shock absorbing capacity in the suspension. This is basically unacceptable for passenger or other vehicles and therefore, in accordance with the present system, special provision is made to enable the rams 14 and 16 to operate in a dual way. That is to say, in a first mode of operation they operate as normal double acting hydraulic rams which will move to equilibrium positions which are determined by lateral acceleration and other factors, as mentioned above, in order to counter the effects of body roll of the vehicle and, in a second mode, in which they are able to accommodate transient displacements from the equilibrium position in order to function as shock absorbers which would normally be incorporated into a vehicle suspension system. It will be appreciated that whilst the rams are operating as shock absorbers, they must still be generally capable of supporting the loading applied thereto otherwise the suspension of the vehicle would not function satisfactorily. In other words if the rams did not maintain the load applied thereto, the wheels of the vehicle would collapse into the wheel arches or move to fully extended positions which of course is unacceptable. The transient operation of the rams will be described below.

Figure 5:
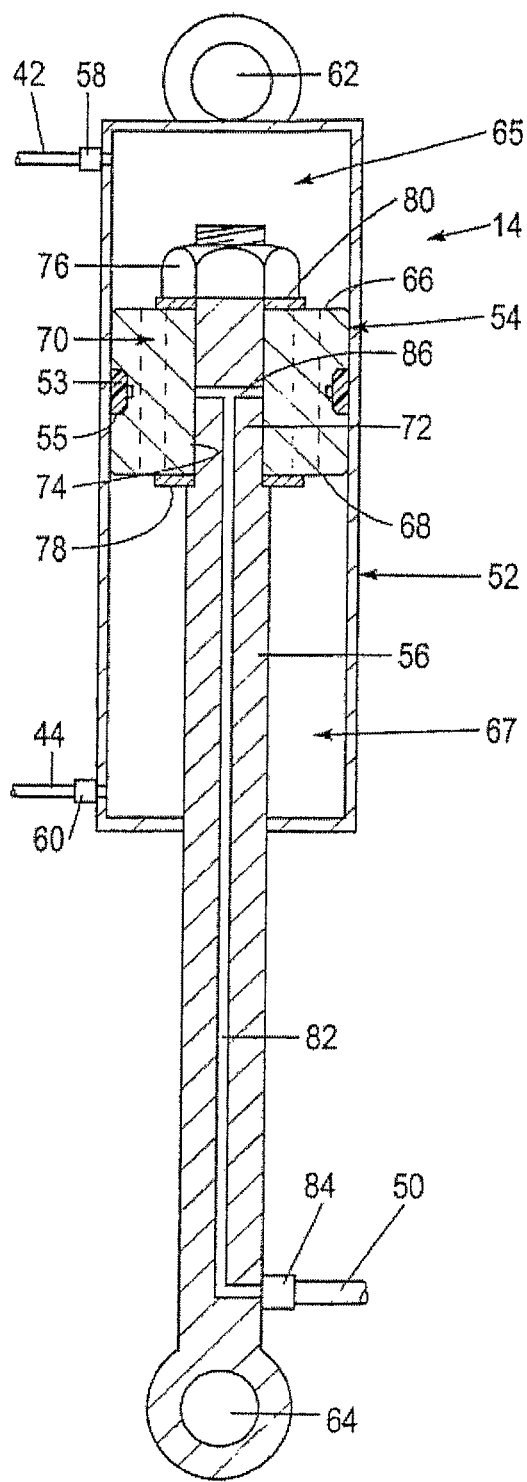
FIG. 5 is a simplified cross-sectional view through a ram.
Figure 6:
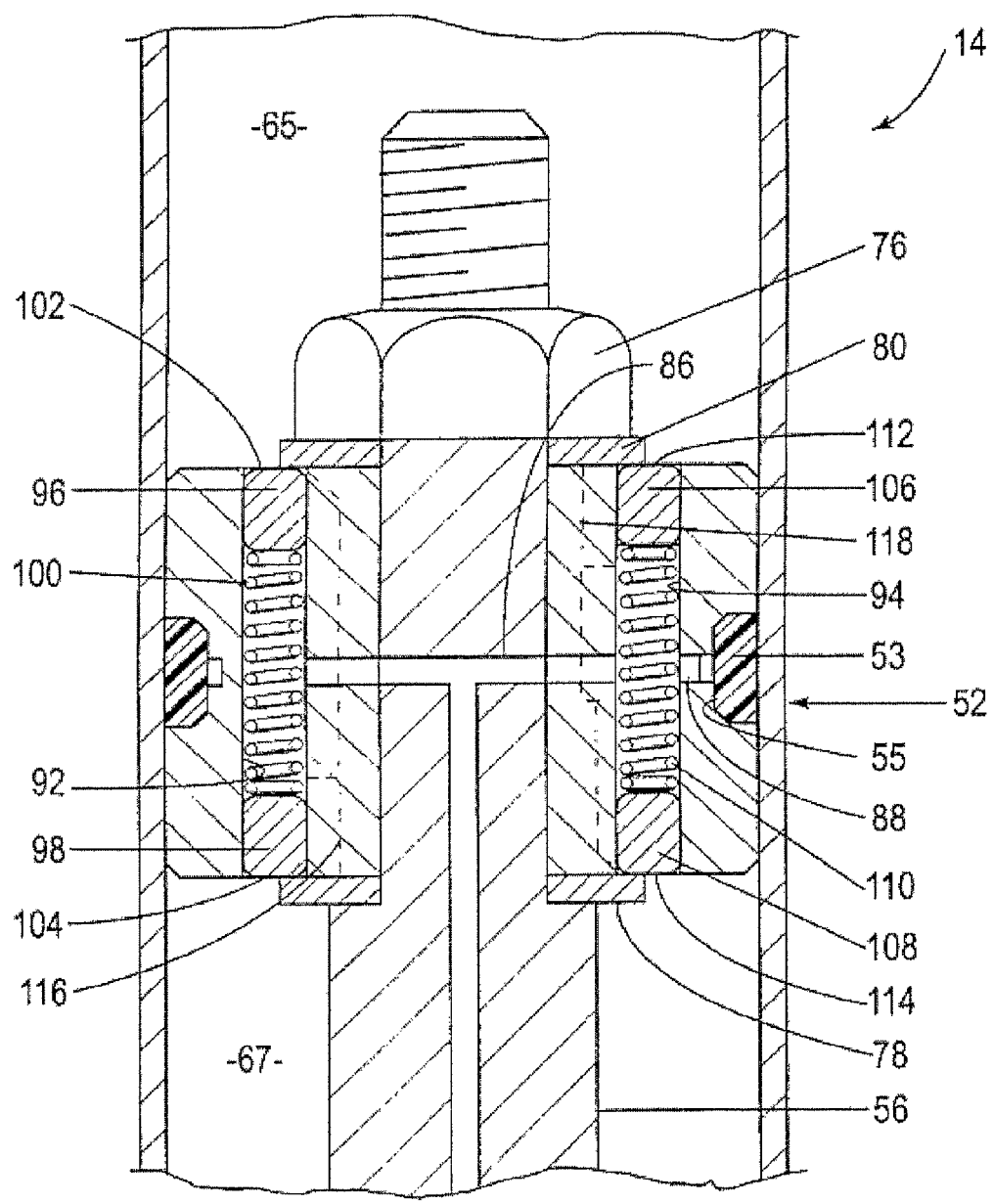
FIG. 6 is a more detailed view in partial axial section.

FIGS. 5 and 6 illustrate in more detail the structure of the ram 14 which enables the transient response. The rams 16, 18 and 20 can be of similar construction and therefore need not be described.

The ram 14 schematically shown in FIG. 5 includes a cylinder 52 and a main piston 54 which is mounted on a piston rod 56, the piston and piston rod being slidable within the cylinder 52, in the usual way. A seal 53 is located in a groove 55 extending about the circumference of the piston, as shown. Fluid couplings 58 and 60 are provided near the top and bottom of the cylinder 52. These couplings enable fluid communication with the valve 36. For the ram 14, the upper coupling 58 is coupled to the outlet line 42 and the lower coupling 60 is coupled to the outlet line 44. The top of the cylinder 52 is provided with a coupling 62 which enables it to be connected to the chassis 22 of the vehicle, in the usual way. A coupling 64 is provided on the lower end of the rod 56 to enable the lower end of the shaft to be coupled to the axle assembly 24. The ram 14 can alternatively be mounted in an opposite position to that shown in FIG. 3, in other words, with the cylinder 52 connected to the axle assembly and the piston rod 56 connected to the vehicle chassis 22. Upper and lower working chambers 65 and 67 are defined within the cylinder 52 above and below the main piston 54.

When the vehicle is stationary or moving in a straight line, the pressure in the lines 42 and 44 is the same and the piston 54 is arranged to be in an equilibrium position which is generally centrally located relative to the cylinder 52. The vehicle suspension and springs dictate the normal static position of the vehicle body (sprung mass) relative to the wheels and axles (unsprung mass), in the usual way. If the vehicle turns left, the pressure in line 42 will increase in accordance with the magnitude of the lateral acceleration but the pressure in line 44 will remain at the low return pressure level. This causes the piston 54 to move downwardly to occupy a new equilibrium position which, as described above, will be dependent on a number of factors including the magnitude of the lateral acceleration, weight of the vehicle and characteristics of other components of the vehicle's suspension including the coil spring 30. The control valve will maintain the pressure increase in the line 32 as long as the lateral acceleration of the vehicle continues. Accordingly, there will be pressure differentials across the pistons in the rams so that the rams can support different loads during cornering. In accordance with the invention, the ram 14 includes shock absorbing means for enabling transient or rapid movement of the piston 54 in the cylinder in order to smooth out the effects of shock increases in pressure in the operating fluid within the cylinder caused by perturbations of the road over which the wheel of the vehicle travels. As explained below, the shock increases in pressure are damped, in a way which still enables the pressure differentials to be maintained across the pistons in the rams so that the rams support the loads applied thereto.

If, for example, the wheel of the vehicle strikes a bump or upward projection, the wheel will cause a transient upward force to be transmitted through the piston rod 56. The upper face 66 of the piston 54 will tend to compress the operating fluid in the cylinder above the piston causing a pressure spike therein. Unless this is relieved, the suspension would be very stiff and unpleasant for passengers in the vehicle. If the wheel of the vehicle encounters a pothole or the like, the springs 30 will tend to cause a rapid rebound or downward movement of the wheel which has the effect of causing the lower face 68 of the piston 54 to produce a pressure spike in the fluid in the cylinder beneath the piston. Again, unless this is relieved, the suspension would not exhibit shock absorbing capacity. In accordance with the present system, the piston 54 includes pressure relief means 70 which is responsive to pressure spikes in the fluid in the cylinder 52 on either side of the piston 54 and enables flow of hydraulic fluid therethrough in order to allow the piston 54 to move or oscillate so as to negate the effects of these pressure spikes. The piston 54 will return to its equilibrium position prior to the pressure spike which is appropriate for moving in a straight line or cornering left or right, as the case may be. When the vehicle is cornering, there will be a pressure differential in the working chambers 65 and 67 but when the vehicle is moving in a straight line, there will be no differential across the piston 54.

In the illustrated arrangement, the upper end of the rod 56 has a shoulder which defines a narrower diameter portion 72 which extends through a central axial bore 74 of the piston 54. The upper end of the narrower diameter portion 72 is threaded and a retaining nut is provided to clamp the piston 54 against the shoulder in the rod 56. A lower washer 78 is located between the shoulder in the rod 56 and the piston 54. An upper washer 80 is located between the nut 76 and the upper face 66 of the piston.

The rod 56 includes an axially extending control duct 82, the lower end of which is in fluid communication with a coupling 84 for connection to the control line 50 of the pump 32. The control duct 82 communicates with radially extending ducts 86. As best seen in FIG. 6, there is at least one duct 88 which extends from the duct 86 to the groove 55 so that hydraulic fluid pressure in the duct 86 will bias the seal outwardly into sealing engagement with the inner surface of the cylinder 52.

FIG. 6 diagrammatically shows the pressure relief means 70 in more detail. FIG. 6 is a fragmentary axial cross-section through the ram 14. It will be seen that the piston 54 includes two valve bores 92 and 94. Upper and lower pressure relief valve pistons 96 and 98 are slidably mounted in the bore 92. A compression spring 100 acts between the opposed inner faces of the valve pistons 96 and 98. The outer end faces 102 and 104 of the valve pistons 96 and 98 are exposed to the operating fluid within the cylinder 52. The spring 100 biases the pistons 96 and 98 apart and into engagement with the washers 80 and 78 respectively. The washers 80 and 78 only partly cover the bores 92 and 94 so that hydraulic fluid can enter these bores, as will be described in more detail below. The bore 92 also includes upper and lower pressure relief valve pistons 106 and 108 which are biased apart by means of a compression spring 110. Again, the end faces 112 and 114 are engaged by the washers 80 and 78 so as to retain the valve pistons in the bore 94. The ducts 86 from the control duct 82 communicates with the valve bores 92 and 94. Accordingly, the fluid pressure in the control duct 82 is always uniformly applied to the inner faces of all four valve pistons 96, 98, 106 and 108. The function of the springs 100 and 110 is essentially to always ensure that the duct 86 is not blocked by movement of one or more of the valve pistons. The valve pistons 96 and 98 effectively seal against the valve bore 92 and similarly the valve pistons 106 and 108 seal against the valve bore 94. Accordingly, when the valve pistons 98 are in their closed positions, as shown in FIG. 6, the main piston 54 acts like a solid body and the ram 14 can function in the usual way. Its movement can therefore be controlled by pressure differences between fluid in the lines 42 and 44.

The piston 54 includes two (or more) damping ducts 116 and 118. As will be described in more detail below, hydraulic fluid is permitted to rapidly pass into one or other of the damping ducts in response to a spike or transient increase of pressure above or below the piston. Pressure spikes can be caused by the wheel of the vehicle hitting a bump or falling into a sudden depression. Normally the spikes would be damped out by means of a shock absorber and the damping ducts 116 and 118 enable controlled damping to take place in the ram of the present system.

Figure 7:
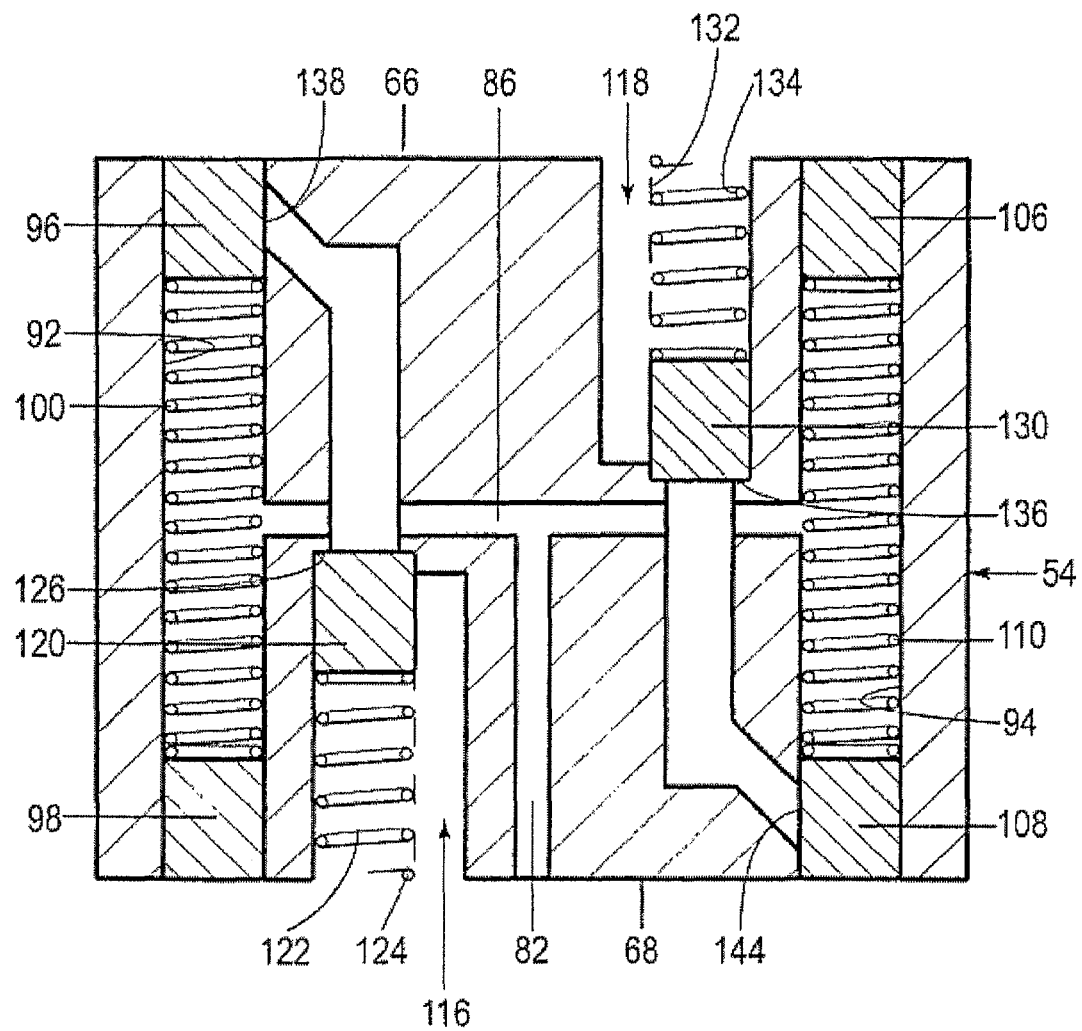
FIGS. 7, 8 and 9 are schematic representations which illustrate the manner in which the ram functions.
Figure 8:
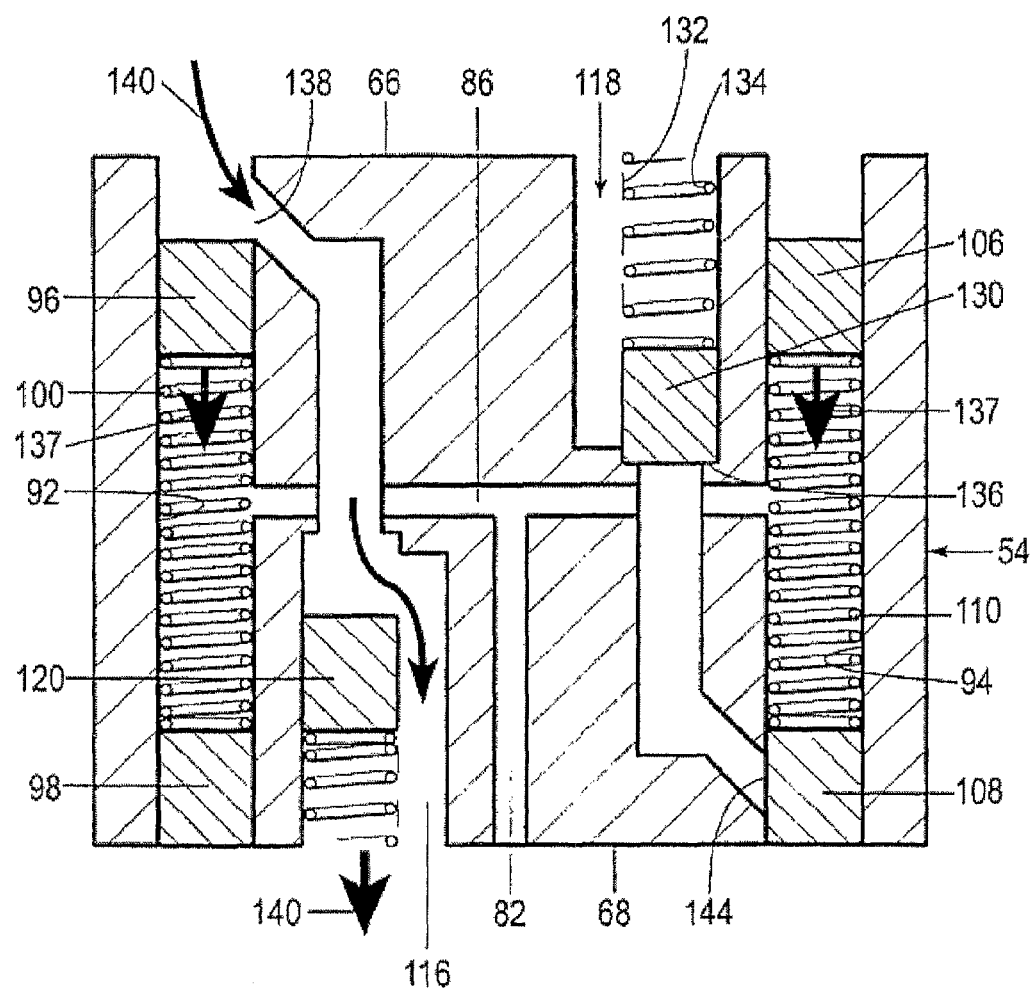
Figure 9:
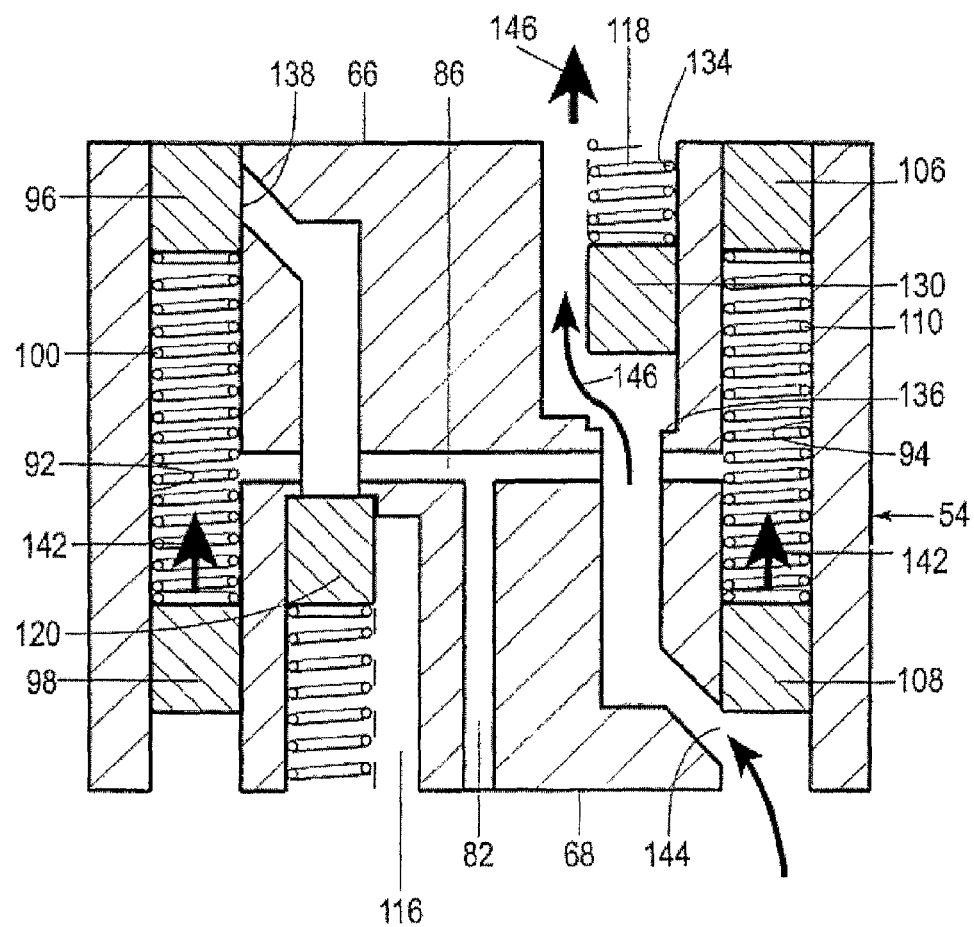

FIGS. 7 to 9 are schematic illustrations of the way in which the valve pistons and damping pistons function in the ram 14. In this arrangement, one end of the damping duct 116 opens to the working chamber 67 beneath the lower face 68 of the piston 54 whereas the damping duct 118 opens to the working chamber 65 above the upper face 66 of the piston 54. The ram may include more than two of the damping ducts so as to improve the performance of the ram, as will be described in more detail below.

In the diagrammatic arrangement shown in FIG. 7, the damping duct 116 is provided with a damping piston 120 which is mounted for sliding movement in a damping bore 122, which forms part of the damping duct 116. A damping spring 124 acts against the lower face of the damping piston 120 and biases the upper face of the piston into a damping valve seat 126. The lower end of the valve 126 is retained in the bore 122 by means of the washer 78. The valve includes a second damping piston 130 which is mounted for sliding movement in a second damping bore 132. A second damping spring 134 biases the lower end face of the damping piston 130 into a valve seat 136. Again, the damping spring 134 is retained in the damping bore 132 by the washer 80.

FIG. 7 shows the piston 54 in an equilibrium position. In this position, the pressure on the upper and lower faces 66 and 68 may be the same, in which case the pressure will be at a relatively low level, say of the order of 15 to 30 psi or, if the vehicle is cornering, there may be a substantial pressure differential in the working chamber 65 and 67 in order that the ram 14 can support increased loading required for countering the effects of body roll during cornering. As explained above, the control valve 36 is arranged to always supply the higher of the pressures applied to the working chamber 65 and 67 to the control duct 82 and therefore the pressure within with valve bores 92 and 94 is always equal to the pressure which is highest in the working chamber 65 or 67. In the case where the vehicle is moving in a straight line, relatively low values of pressure will be applied to the opposed end faces of each of the pressure relief valve pistons, 96, 98, 106 and 108 and the pistons will remain in their closed positions, as shown in FIG. 7. During cornering, even when a substantial pressure differential, say of the order of 500 psi or more, is required between the working chamber 65 and 67, the pressure relief pistons will remain in their closed'positions because the higher pressure is present in the bores 92 and 94. When the pressure relief valve pistons 96, 98, 106 and 108 are in their closed positions, as shown in FIG. 7, the damping pistons 120 and 130 remain seated against their respective valve seats 126 and 136 because the pressure relief valves prevent any flow through the damping passages 116 and 118. Also, the springs 124 and 134 bias the damping pistons 120 and 130 into engagement with their respective valve seats.

FIG. 8 diagrammatically represents the response of the piston 54 when the piston rod 56 has been moved rapidly upwardly such as may occur when a vehicle hits a bump or the like. The rapid upward movement of the piston rod 56 causes a transient increase in hydraulic fluid pressure in the working chamber 65 above the piston 54. When this occurs, the valve pistons 96 and 106 will move rapidly downwardly because the pressure above the main piston 54 to which the upper faces of the pistons 96 and 98 will be transiently very much higher than the equilibrium pressure to which the lower end faces of these pistons are exposed. The pistons 96 and 106 therefore quickly move downwardly, as indicated by arrows 137. Downward movement of the piston 96 opens a transfer port 138 which causes a rapid increase in pressure within the damping duct 116. The pressure will rapidly build up in the damping duct 116 to the point at which the biasing effect of the damping spring 124 is overcome and the damping piston 120 will move downwardly in the damping bore 122. Once this occurs, this will enable flow of hydraulic fluid from the region above the piston 54 to the region below the piston 54. In other words this permits rapid upward movement of the piston 54 and hence the piston rod 56. This causes a reduction in pressure in the working chamber 65 in order to dissipate the transient increase in pressure. When the pressure in the working chamber 65 equals that in the bore 92, the pressure relief piston 96 will close the port 38 and the damping piston 120 will return to its closed position. At this point, however, the piston is rapidly moving upwardly and, as in all dynamic systems, there is likely to be overshoot which will cause a transient reduction in pressure in the cylinder 52 beneath the piston 54. This transient will also be relieved, as will be described below, until the cylinder again moves to an equilibrium position in a damped movement as required. During the initial pressure relief as described in FIG. 8, the valve 108 and damping piston 130 remain in their closed positions. The upper valve piston 106 will move downwardly, like the piston 96, but this may or may not open a damping port, depending on the geometry of the configuration. Significantly, however, the damping duct 118 remains closed to flow of hydraulic fluid therethrough. Also, it will be appreciated that because of the fact that the higher of the two pressures applied in the working chamber 65 and 67 is always present in the bores 92 and 94, the valve 96 can be transiently displaced from its equilibrium position to enable damping to occur but still enabling a pressure differential to be maintained between the working chambers 65 and 67 in order to enable the ram 14 to support loads applied thereto.

FIG. 9 schematically illustrates an arrangement in which there is a transient increase in pressure in the working chamber 67 beneath the piston 54. This can be caused by the wheel of the vehicle falling into a pothole or the like, in which case the springs 30 will cause a rapid downward movement of the piston 54. The same effect can be caused during overshoot of the piston 54 in response to striking a bump or the like. In this case, when there is a transient pressure increase in the hydraulic fluid in the chamber 67, both the valve pistons 98 and 108 will be caused to rapidly move upwardly against their respective springs 100 and 110, as indicated by arrows 142. Upward movement of the piston 108 causes opening of a port 144 which permits flow of hydraulic fluid into the damping duct 118, as indicated by arrow 146. This causes a rapid build-up of pressure within the duct 118 and when the pressure has built-up sufficiently, it will cause the damping piston 130 to move away from the valve seat 136 and cause flow of fluid through the duct 118 into the working chamber 67, as indicated by arrows 146. Again, the compression spring 110 against which the valve piston 108 is quite light and therefore the port 144 is opened very rapidly. The movement of the damping piston 130 is subject to overcoming the biasing force of the damping spring 134 and the spring force can be adjusted so as to affect the dynamics of the response and hence the degree of damping.

It will be appreciated that if the damping springs 124 and 134 are very light, then rapid damping will occur and the suspension will be very "soft". If, however, the spring forces of the springs 124 and 134 is greater, the damping will be less and the suspension will be correspondingly stiffer.

It will be appreciated from FIGS. 6, 7 and 8 that spikes or transient increases in pressure in the hydraulic fluid above or below the main piston 54 will cause selective opening of the valve pistons which in turn expose the damping pistons to the transient increases in pressure. The damping pistons will move once the biasing force of the damping compression springs have been overcome. Thus the ram can function as a normal double acting hydraulic ram which incorporates a shock absorbing action. The degree of shock absorbing action can be controlled by a number of factors such as the relative diameters of the pistons, sizes of ports and so on but the main factor will be the biasing force applied by the damping springs 124 and 134. The damping action is operable to damp transient increases in pressure in the working chambers 65 and 67 caused by the wheel of the vehicle hitting a bump or depression and/or by overshoot caused by initial and subsequent responses of the piston to the initial transient. After damped movement of the main piston 54, it will return to its equilibrium position as determined by the pressure generated by the valve 36. As explained above, the valve 36 produces relatively low pressures when the vehicle is moving in a straight line and the low pressures are applied to both working chambers 65 and 67. When, however, the vehicle is cornering, the valve 36 produces a significant pressure differential between the chambers 65 and 67, which is maintained notwithstanding the damping action described above.

Figure 10:
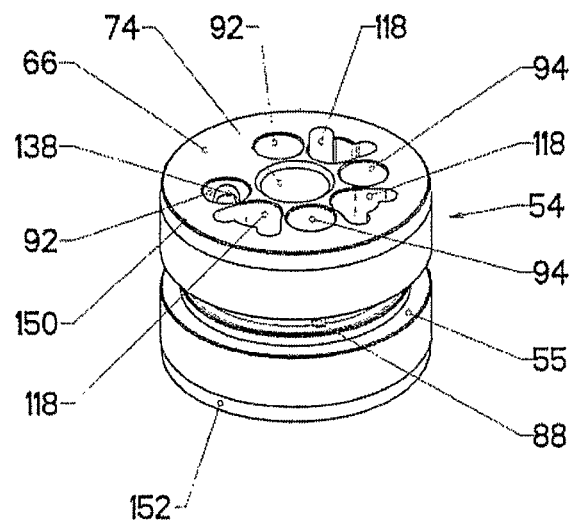
FIGS. 10 and 11 are isometric views of the main piston.
Figure 11:
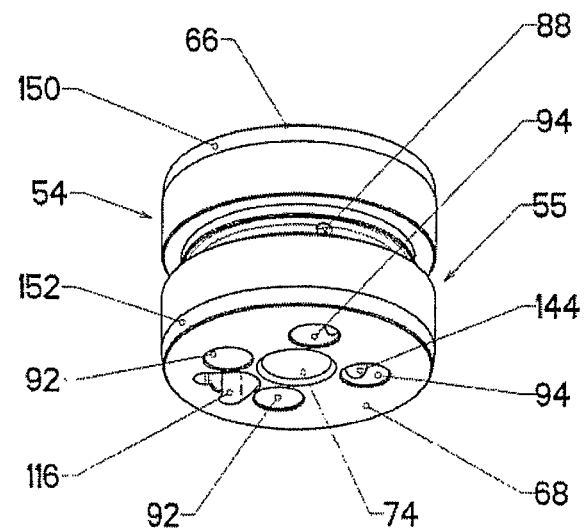
Figure 12:
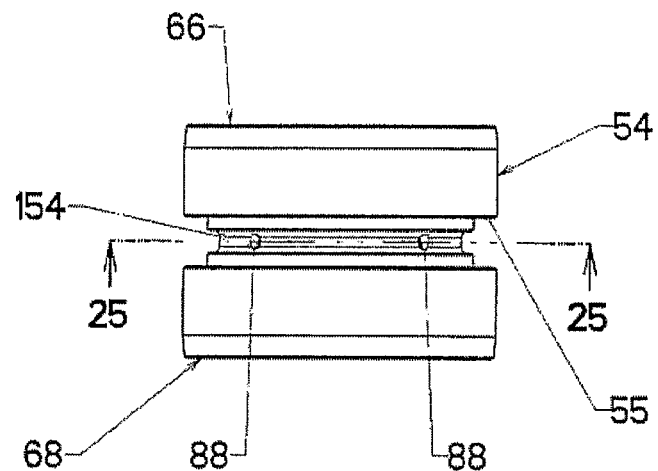
FIG. 12 is a side view of the main piston.
Figure 13:
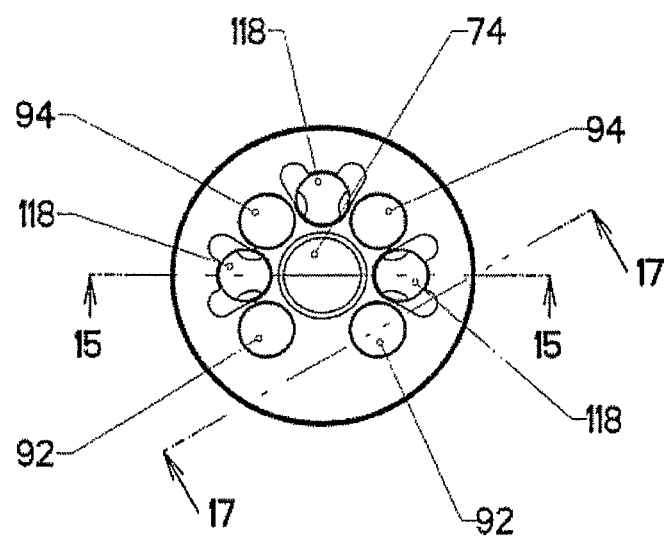
FIG. 13 is a plan view of the main piston.
Figure 14:
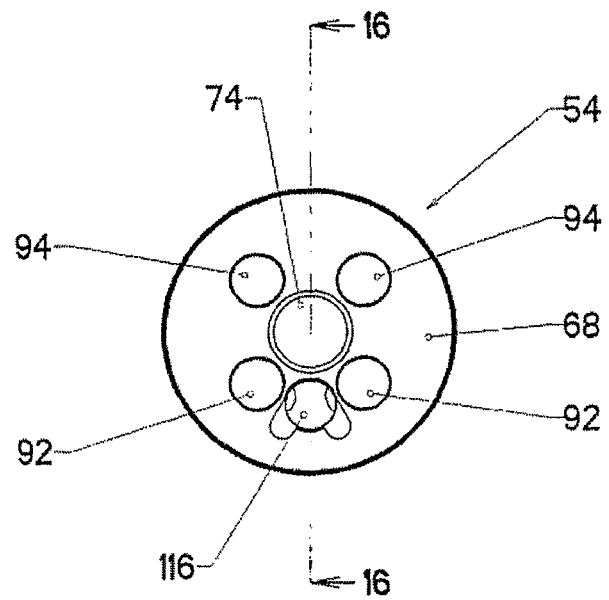
FIG. 14 is an underside view of the main piston.
Figure 15:
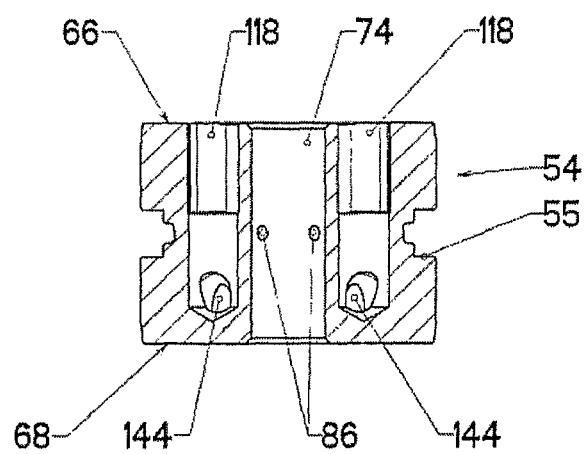
FIG. 15 is a cross-sectional view along the line 15-15.

FIGS. 10 to 26 illustrate in more detail one arrangement for the main piston 54, the other components such as the valve pistons, damping pistons and springs have been omitted for clarity of illustration. In this arrangement, there are two of the valve bores 92 and two of the valve bores 94. In this arrangement, however, there is a single damping duct 116 and three damping ducts 118. This is chosen so as to provide more damping in a rebound action rather than in the opposite direction. As seen in FIGS. 10 and 11, the outer cylindrical surface of the main piston 54 is formed with slightly tapering end zones 150 and 152. Also it will be seen that there are four of the ducts 88 which open to a recess 154 in the groove 55 which thereby enables more uniform distribution of oil pressure within the groove 55 and therefore enable more uniform expansion of the seal 53. The recess 154 communicates with the ends of the ducts 88, as shown.

Figure 16:
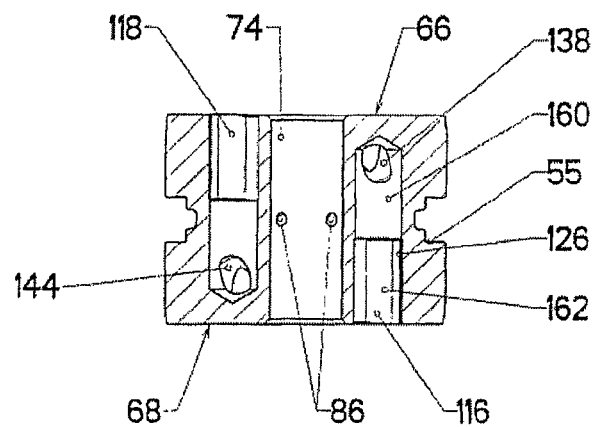
FIG. 16 is a cross-sectional view along the line 16-16.
Figure 17:
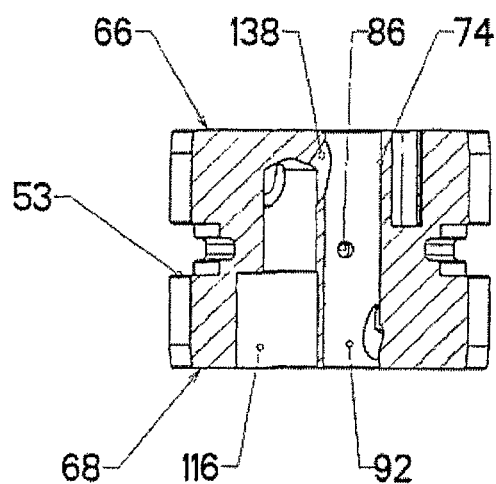
FIG. 17 is a cross-sectional view along the line 17-17.
Figure 18:
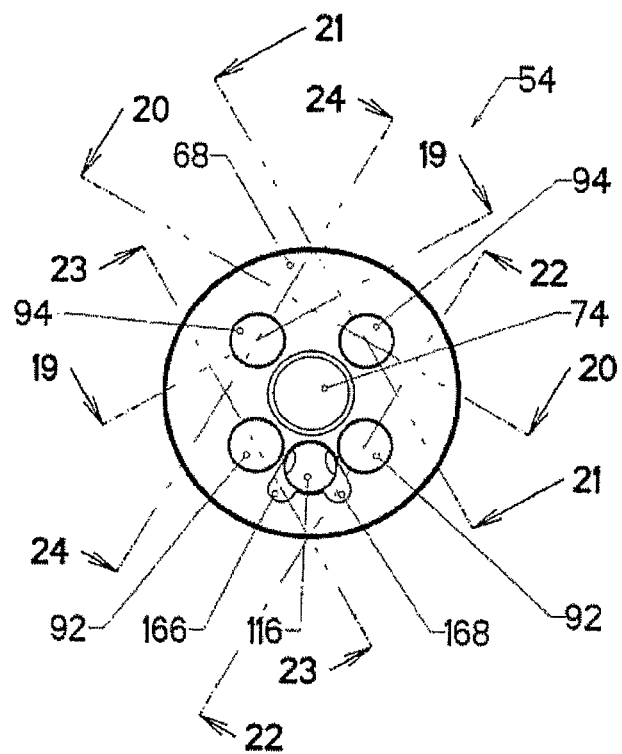
FIG. 18 is an underside view of the main piston.
Figure 19:
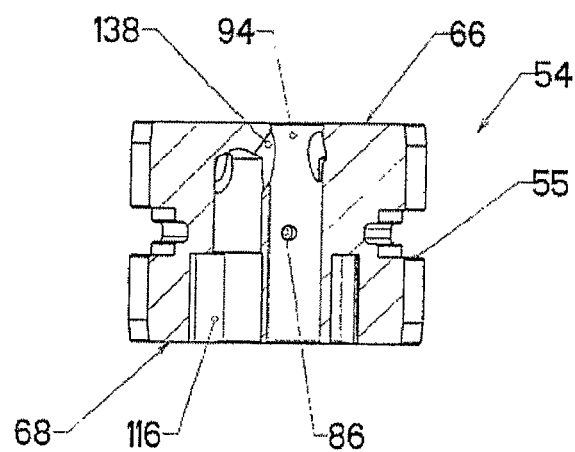
FIG. 19 is a cross-sectional view along the line 19-19.
Figure 20:
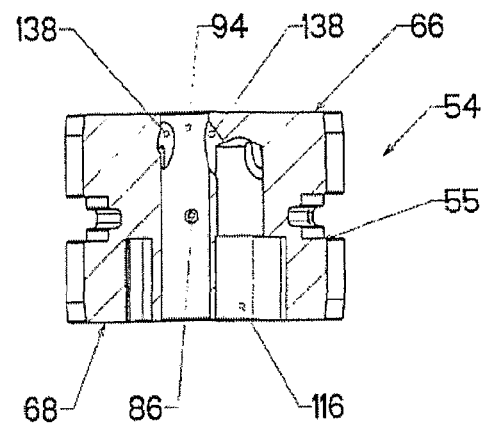
FIG. 20 is a cross-sectional view along the line 20-20.
Figure 21:
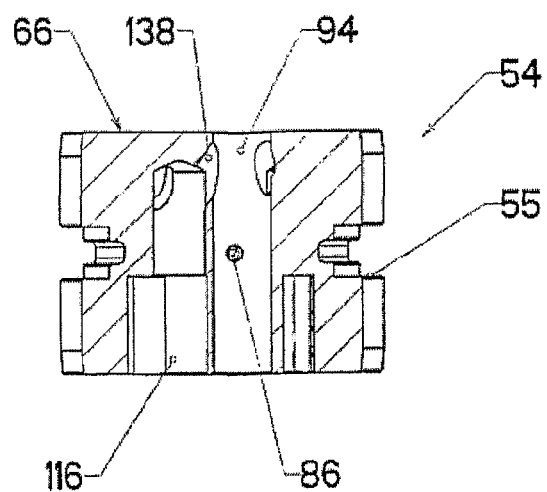
FIG. 21 is a cross-sectional view along the line 21-21.
Figure 22:
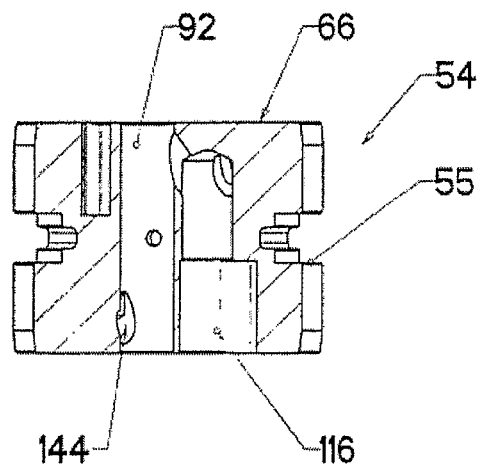
FIG. 22 is a cross-sectional view along the line 22-22.
Figure 23:
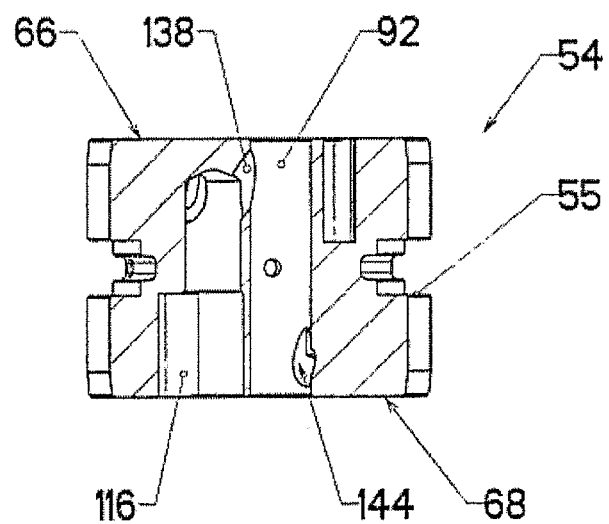
FIG. 23 is a cross-sectional view along the line 23-23.
Figure 24:
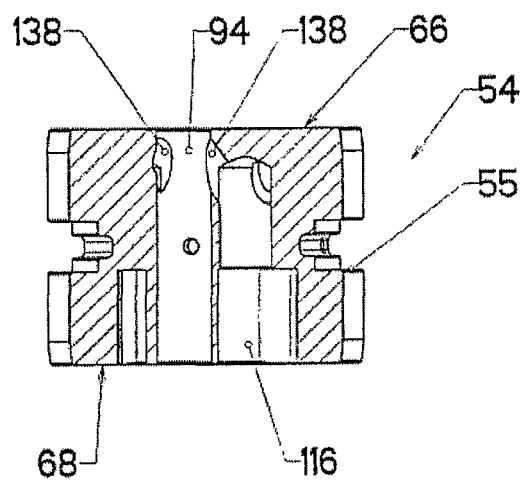
FIG. 24 is a cross-sectional view along the line 24-24.
Figure 25:
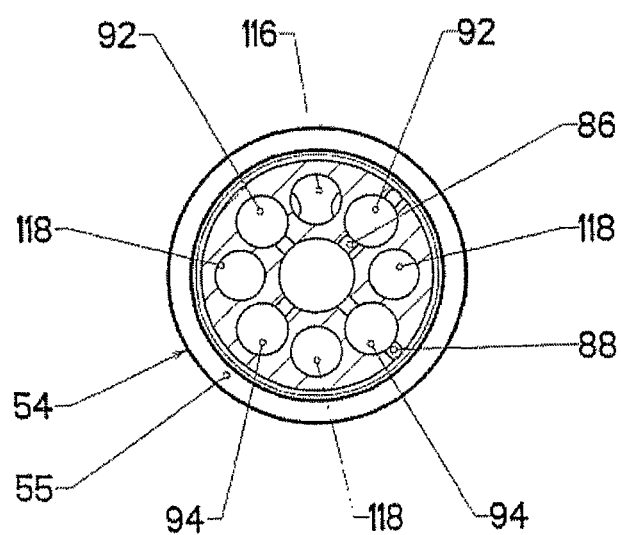
FIG. 25 is a cross-sectional view along the line 25-25.

As shown in FIG. 16, the damping duct 116 is formed in part by a stepped bore which includes an upper portion 160 and a lower wider portion 162. The step between the two portions forms the valve seat 126 for the damping piston 120. The lower portion 162 is flanked by two side lateral bores 166 and 168. The lateral bores 166 and 168 provide the fluid communication paths to the lower face 68 of the main piston 54 once the damping piston 120 has been unseated. The parts of the lower portion 162 of the bore define the damping bore 122 which constrains the damping piston 120 to linear movement.

Each of the damping ducts 118 is formed in a similar way to the duct 116 and need not be described in detail. In each duct 118, the shoulder at the step in the duct 118 defines the valve seat 136 and the wider upper portion of the bore defines the second damping bore 132 which constrains the damping piston 130 to linear movement.

It is possible to arrange for the valve bores 92 and 94 to be provided with ports 138 at their upper ends and ports 144 at their lower ends so as to cooperate with laterally adjacent ducts 116 and 118.

Figure 26:
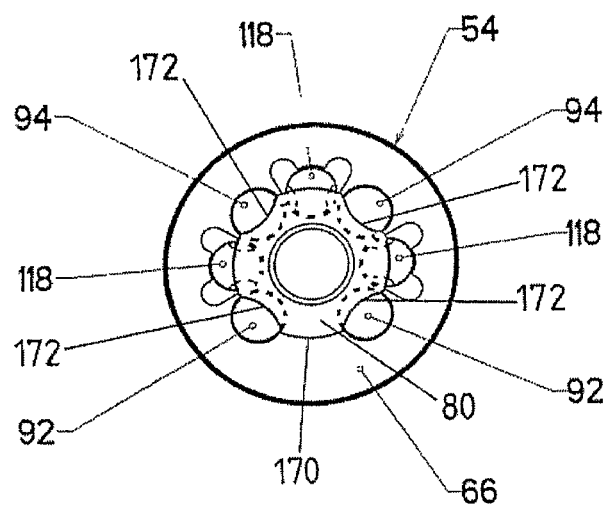
FIG. 26 is a schematic view showing in more detail an upper retaining washer.

FIG. 26 shows the preferred shape for the upper washer 80. It will be seen that its outer edge 170 partly overlies each of the bores 92 and 94 and the duct 118 so as to allow fluid communication therewith. The outer edge 170 includes concave recesses 172 which overlie the bores 92 and 94, as shown so as to increase the exposed surface area of the pistons 96 and 130 to the hydraulic fluid in the working chamber 65.

Figure 27:
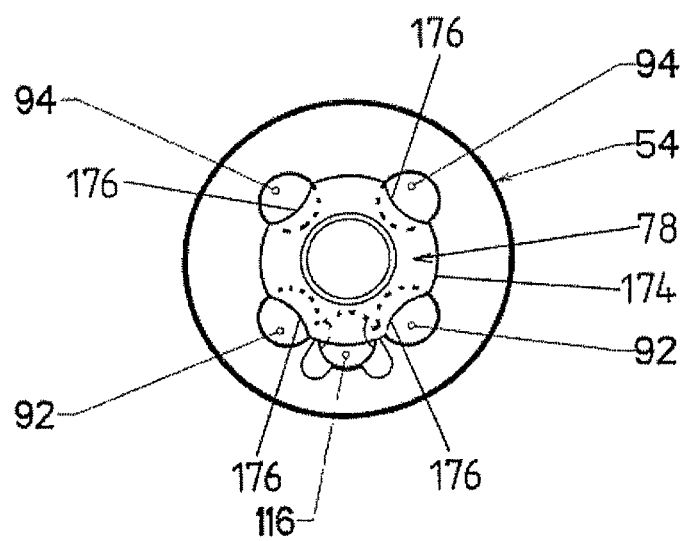
FIG. 27 is a schematic view showing in more detail a lower retaining washer.

FIG. 27 illustrates in more detail the preferred shape for the lower washer 78. It has a generally round outer edge 174 which again partly overlies the bores 92 and 94 and the duct 116. Again, the edge 174 is provided with four concave recesses 176 to provide more exposure of the lower faces of the valve pistons 98 and 108 to the hydraulic fluid in the working chamber 67. Washers 80 and 78 may include dimples (not shown) which project somewhat inwardly relative to the ducts 118 and 116 so as to facilitate retaining of the ends of the damping springs 124 and 134 in the bores 122 and 132 respectively.

As indicated above, the damping performance of the ram is dependent on the spring force of the damping compression springs 124 and 134. In accordance with a preferred example, these can be selected to provide a predetermined damping response. For instance in the arrangement illustrated above, there are three of the damping ducts 118 and accordingly there are three of the damping compression springs 134. The compression forces of the springs 134 could be all the same but preferably they are arranged in increasing magnitude so that each of the damping pistons 130 will open at slightly different times as a pressure spike causes rapid increase of pressure within the cylinder. The springs 124 and 134 can also be of different strengths so that the suspension will have different responses to bumps and rebounds.

The dimensions of the device can be varied to suit requirements. Typically the diameter of the piston 54 is 32 mm and the end zones 150 and 152 taper at say 5°. For automobiles and four wheel drive vehicles, it is expected that the diameter of the pistons 54 would normally be in the range from 35 mm to 50 mm. In this case the diameters of the pressure relief valve pistons and damping pistons would normally be in the range from 6 mm to 9 mm. The length of the piston 54 would be in the range of say 30 mm to 35 mm. The diameter of the bore 74 may be typically 10 mm. The inner portions of the damping ducts may be of the order of 1 mm less in diameter than the outer portions. The lengths of the pressure relief pistons and damping pistons would normally be in the range 5 mm to 10 mm. It is thought that the weight of the pistons is not critical because the hydraulic fluid pressures to which they will be subjected will be very substantial and will tend to negate effects caused by inertia of the pistons. The total length of the main piston 54 may be say 30 mm to 35 mm. Typically the valve pistons 96, 98, 106 and 108 will need to move through a relatively small distance, say 2 mm, before the ports associated therewith are opened. The total stroke of the main piston 54 is of the order of 150 mm. The springs 100 and 110 can be very light weight since their sole function is to keep the pressure relief pistons 96, 98 and 106, 108 from sticking together and blocking the duct 86. The damping springs 124 and 134, however, do have an important effect on the performance of the ram because they change the damping rate. The values of these springs, however, can be varied considerably from very light weight which will produce a very soft shock absorber to comparatively heavy weight which will produce a stiff shock absorber. Typically the spring constant of these springs will be in the range from about 0.1 kg/cm to 55 kg/cm but these may be varied outside this range in special circumstances. For heavier vehicles such as trucks and the like, the diameter of the piston 54 would be greater, say in the range from 50 mm to 100 mm. The diameters of the pressure relief valve pistons and damping pistons would normally be in the range from 7 mm to 12 mm. For heavier vehicles, the springs 100 and 110 can be light but the damping springs 124 and 134 will be correspondingly heavier.

Figure 28:
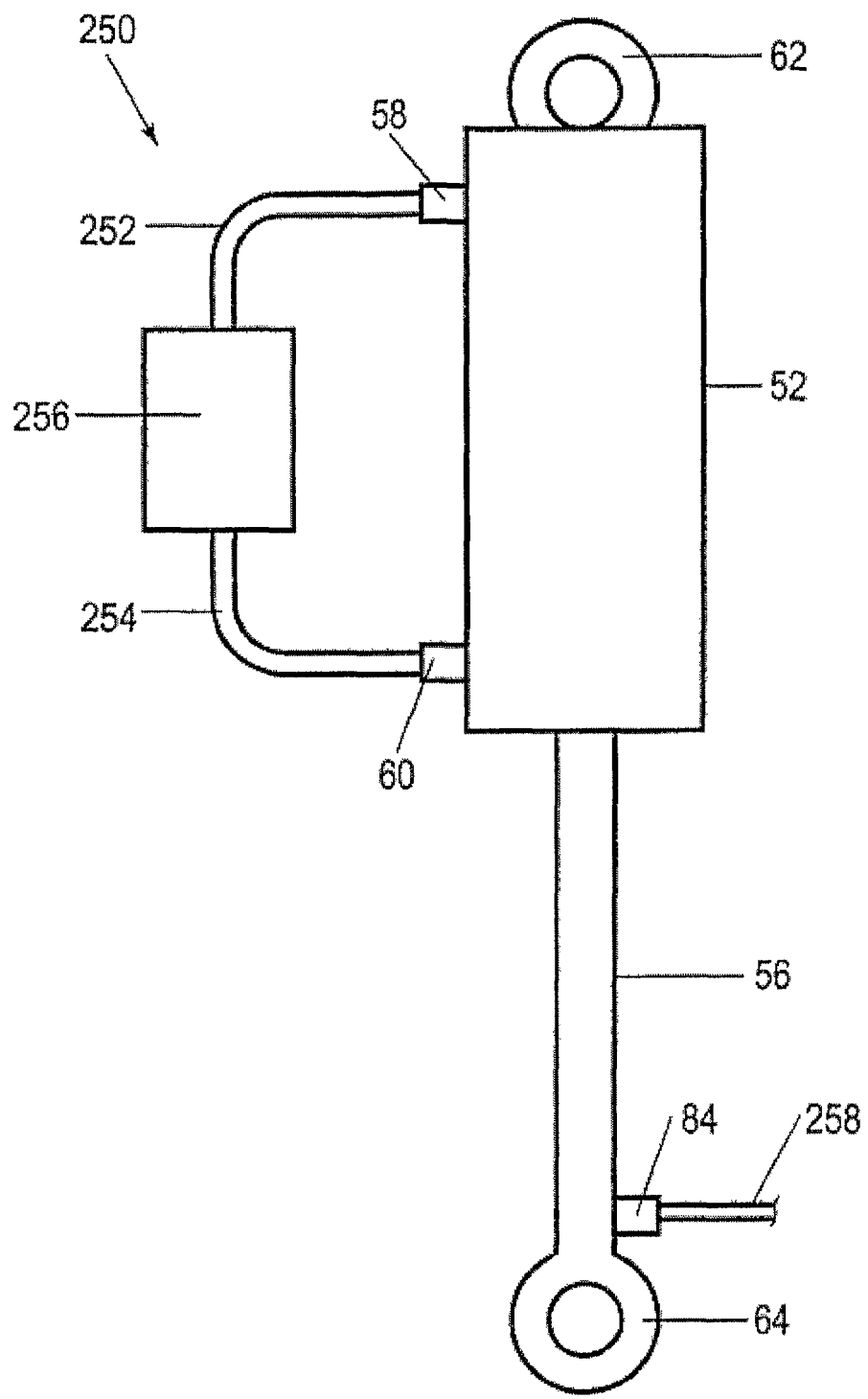
FIG. 28 schematically illustrates an alternative embodiment.

FIG. 28 diagrammatically illustrates an adjustable shock absorber 250. The shock absorber essentially comprises an hydraulic ram constructed in accordance with the rams described and illustrated above and therefore details of the piston thereof need not be described. Its couplings 58 and 60 are connected to lines 252 and 254 which are in fluid communication with an hydraulic fluid reservoir 256. The coupling 84 is connected to a control line 258 which receives control signals in the form of pressure variations in the control fluid therein. These control signals could be derived from any device which produces variable pressure signals in response to a manual or other input. For instance the device could be like the control valve 36 except that the arm 40 is manually operated in order to increase or decrease the stiffness of the shock absorber 150 as required. Increasing the pressure in the control line 258 would have the effect of requiring larger pressure spikes in the fluid above and below the piston 54 in order to move the auxiliary pistons to the point wherein they open to allow movement of the main piston 54. In other words, the stiffness of the shock absorber 250 can be increased or decreased by increasing or decreasing pressure on the control line 258.

With reference to FIGS. 29 to 39, there is shown an alternative main piston 300 which is mounted for movement within the cylinder 52 of the ram in the same manner as shown in FIG. 5. The main piston 300 differs from the main piston 54 in that it is formed as a three-part piston so as to optimise operation of the active suspension system when subjected to transient increases in fluid pressure within the ram, which may be caused by bumps, potholes and the like in a road surface on which the vehicle is travelling. The three-part main piston 300 is formed of a main body, to which upper and lower parts are fitted. Each of the upper and lower parts has a respective sealing member which prevents flow of fluid between upper and lower working chambers of the ram in the absence of transient increases in pressure and, when transient increases in pressure are experienced, the sealing members are transiently displaced to allow flow of fluid between the upper and lower working chambers so as to permit rapid movement of the piston to provide shock absorption to the sprung mass of the vehicle.

More specifically, the active suspension system includes at least one fluid operated ram having a cylinder 52 and a main piston 300 mounted therein for reciprocating movement. Control means is provided as shown in FIG. 4 for controlling an equilibrium position of the piston 300 in the ram in response to lateral acceleration of the vehicle, in order to counter the effects of body roll of the vehicle.

Figure 29:
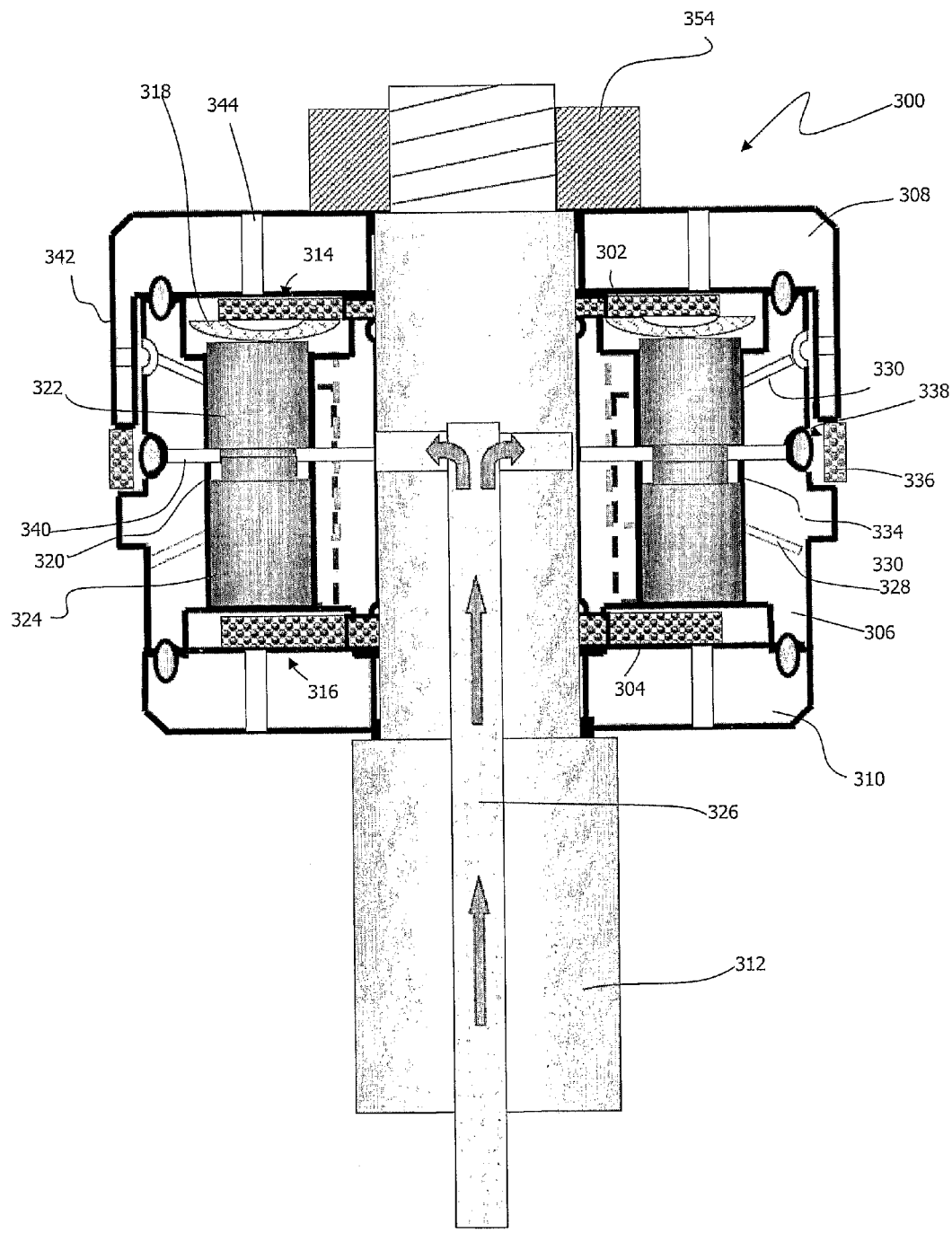
FIG. 29 is a cross-sectional view of an alternative main piston.
Figure 30:
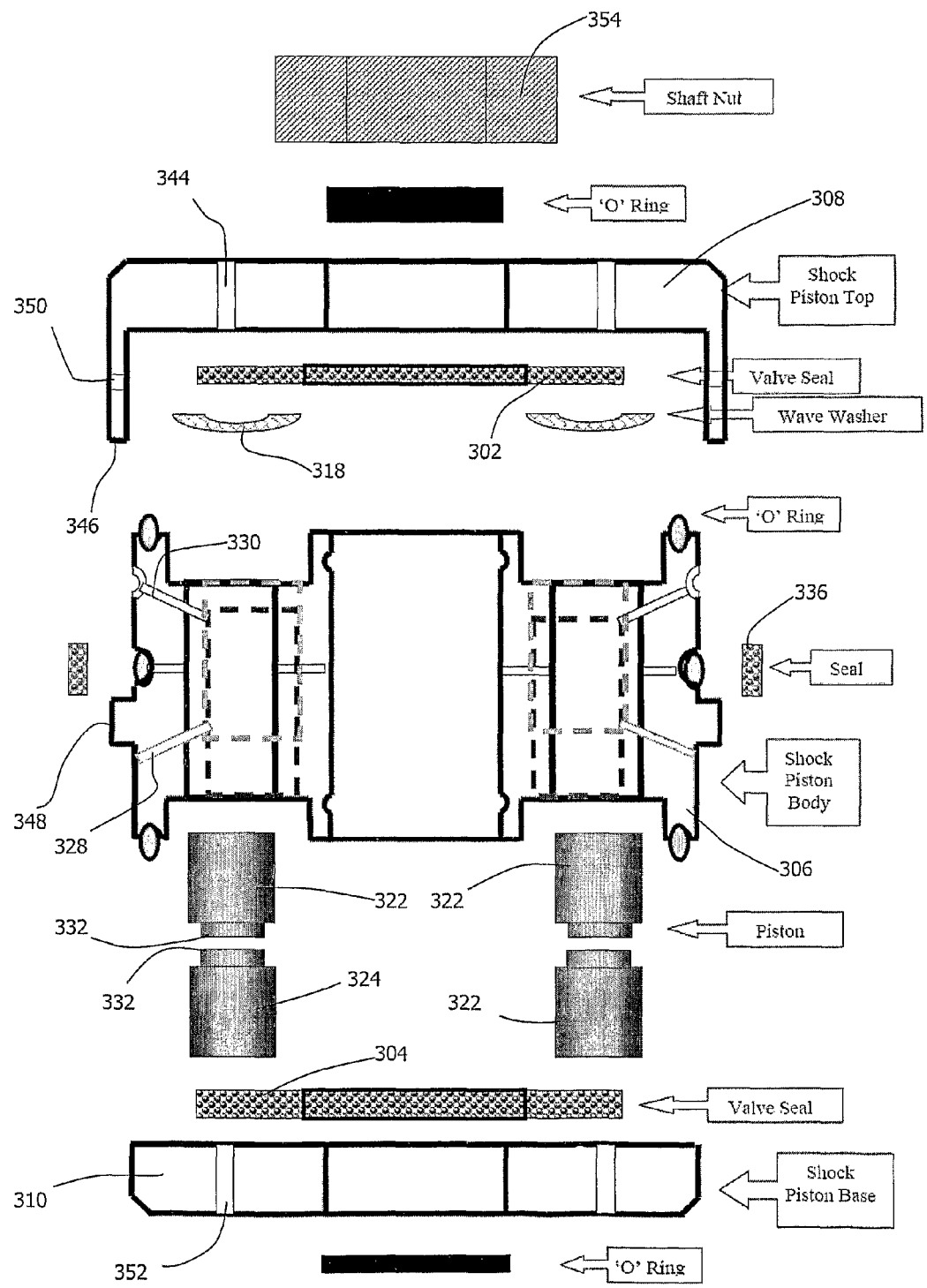
FIG. 30 is an exploded view of the main piston of FIG. 29.
Figure 31:
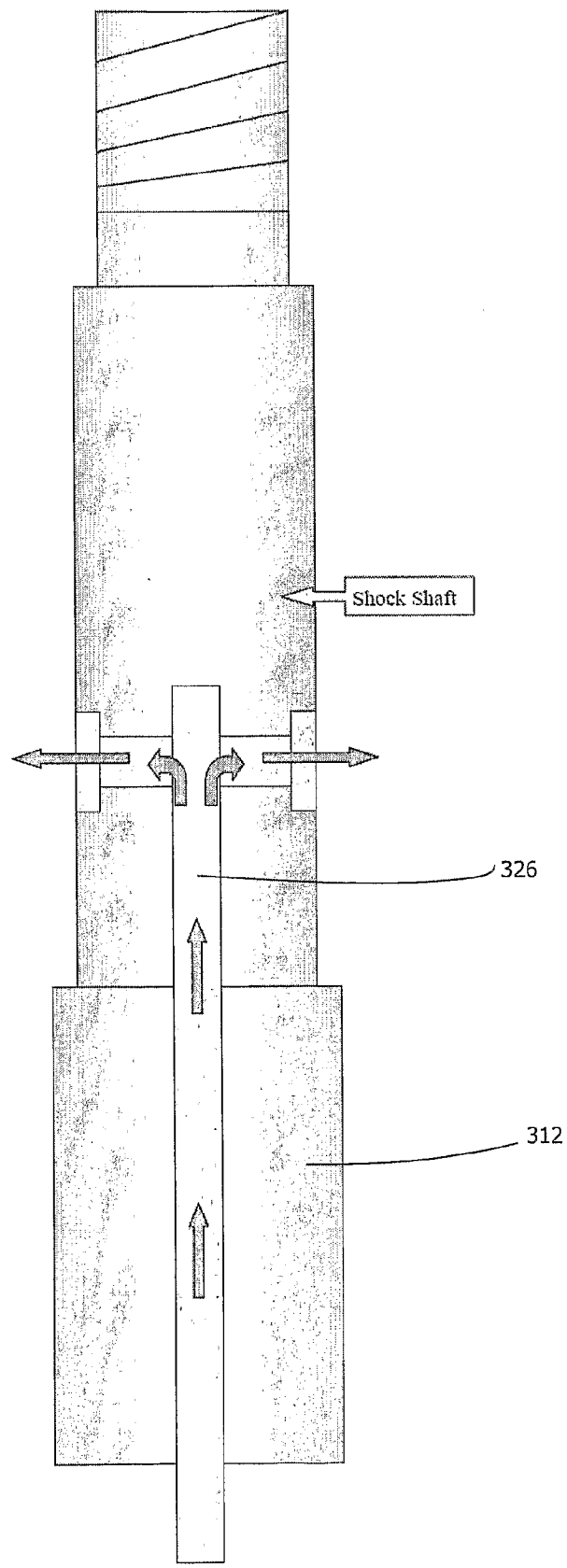
FIG. 31 is a cross-sectional view of a piston rod of the main piston shown in FIG. 29.

The ram includes shock absorbing means including an upper sealing member 302 and a lower sealing member 304. The upper and lower internal sealing members are mounted within the main piston 300 for permitting rapid movement of the piston 300 from the equilibrium position when operating fluid in the ram is subjected to transient increases in pressure. The main piston 300 includes a main body 306, and upper and lower parts 308, 310 fitted to the main body, as shown in FIG. 29. FIG. 30 shows the main piston 300 with the upper and lower parts 308, 310 removed from the main body 306, and FIG. 31 shows a piston rod 312 with the main piston 300 removed therefrom. The piston rod 312 is connected to an axle assembly 24 of the vehicle by a coupling 64 in the same manner as is shown in FIG. 5.

The upper internal sealing member 302 is fitted to rest in a sealing configuration against an inner surface 314 of the upper part 308 and is arranged such that an upper surface of the sealing member 302 is in direct communication with an upper working chamber 65 above the main piston 300, and a lower surface of the sealing member 302 is in direct communication with a lower working chamber 67 below the main piston 300. Similarly, the lower internal sealing member 304 is fitted to rest in a sealing configuration against an inner surface 316 of the lower part 310, and is arranged such that an upper surface thereof is in direct communication with the upper working chamber 65 and a lower surface thereof is in direct communication with the lower working chamber 67.

By way of this arrangement, a transient increase in fluid pressure in the upper working chamber 65 causes the upper internal sealing member 302 to transiently displace from the sealing configuration against the upper part 308 to allow fluid to flow from the upper working chamber 65 to the lower working chamber 67. Similarly, a transient increase in fluid pressure in the lower working chamber 67 causes the lower internal sealing member 304 to transiently displace from the sealing configuration against the lower part 310 to allow fluid to flow from the lower working chamber 67 to the upper working chamber 65.

The upper and lower internal sealing members 302, 304 may be in the form of diaphragms, and a resilient means in the form of a wave washer 318 may be provided to act between the upper and lower diaphragms so as to bias the diaphragms toward their sealing configurations. In the example shown, the main piston 300 is provided with an internal cylinder 320 having a pair of opposed internal pressure relief pistons 322, 324 mounted for movement within the internal cylinder 320. An upper one of the pressure relief pistons 322 is adapted to exert pressure upwardly against the upper sealing member 302, and a lower one of the pressure relief pistons 324 is adapted to exert pressure downwardly against the lower sealing member 304. As can be seen in FIG. 29, the wave washer is mounted between the upper pressure relief piston 322 and the upper sealing member 302 and, by virtue of the ability of the pressure relief pistons 322, 324 to slide within the internal cylinder 320, the wave washer 318 is useful in opposing inward displacement of both sealing members 302, 304.

The main piston 300 is provided with a control duct 326 for supplying operating fluid at a control pressure between the upper and lower pressure relief pistons 322, 324, and the control pressure is able to be varied to adjust a force exerted by the upper and lower pressure relief pistons 322, 324 against the upper and lower sealing members 302, 304. Accordingly, the control pressure may be varied so as to adjust the hardness of the shock absorption provided by the active suspension system. The adjustment of the hardness of the shock absorption may be adjusted either manually as desired by a user of the vehicle, or may be controlled automatically by a control system. Advantageously, the present system is adapted such that the control pressure is increased with an increase in lateral acceleration of the vehicle so as to provide a harder rate of shock absorption during cornering.

Figure 32:
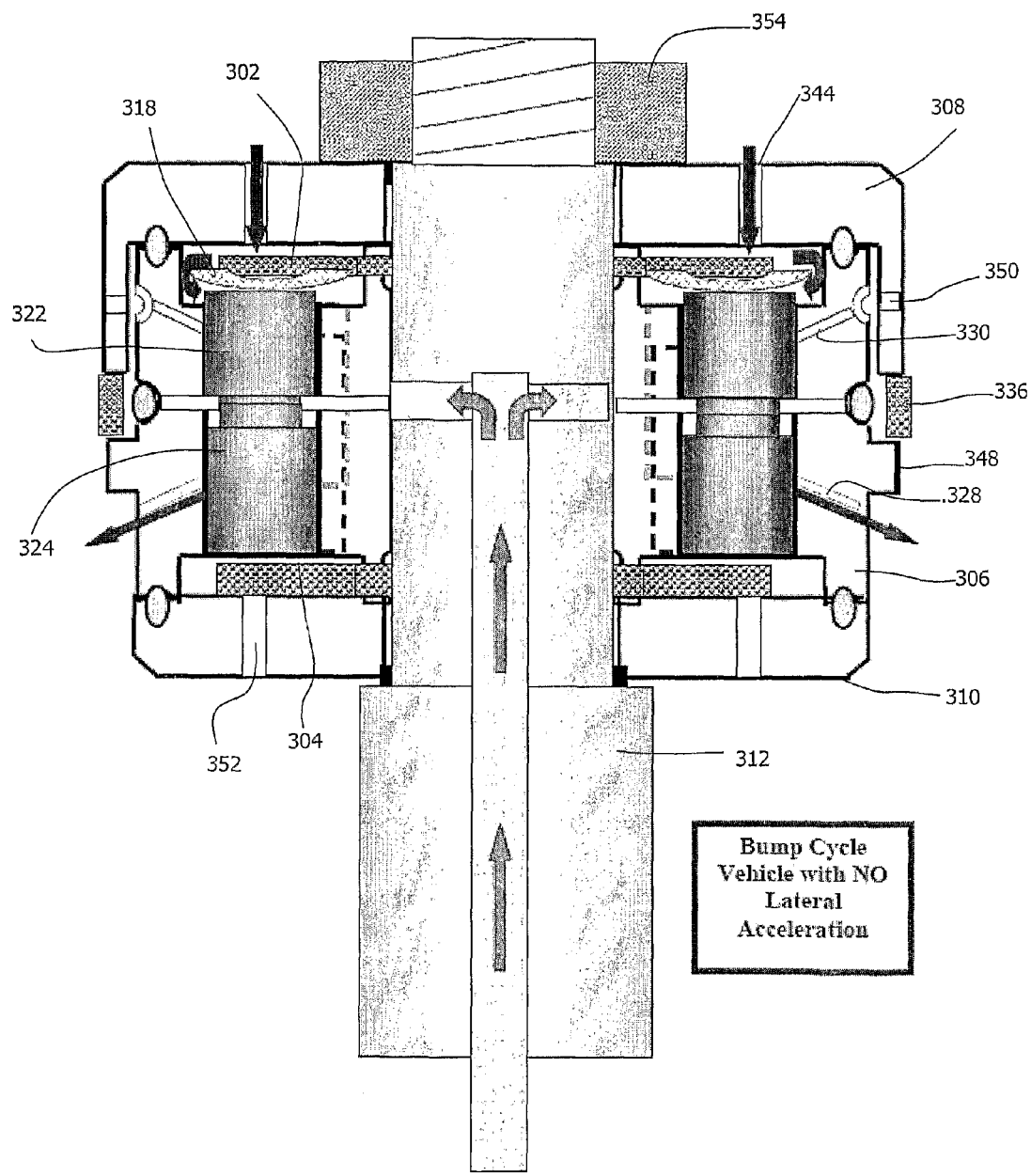
FIG. 32 is a cross-sectional view of the main piston of FIG. 29, showing operation of the main piston during a transient increase in fluid pressure above the main piston.
Figure 33:
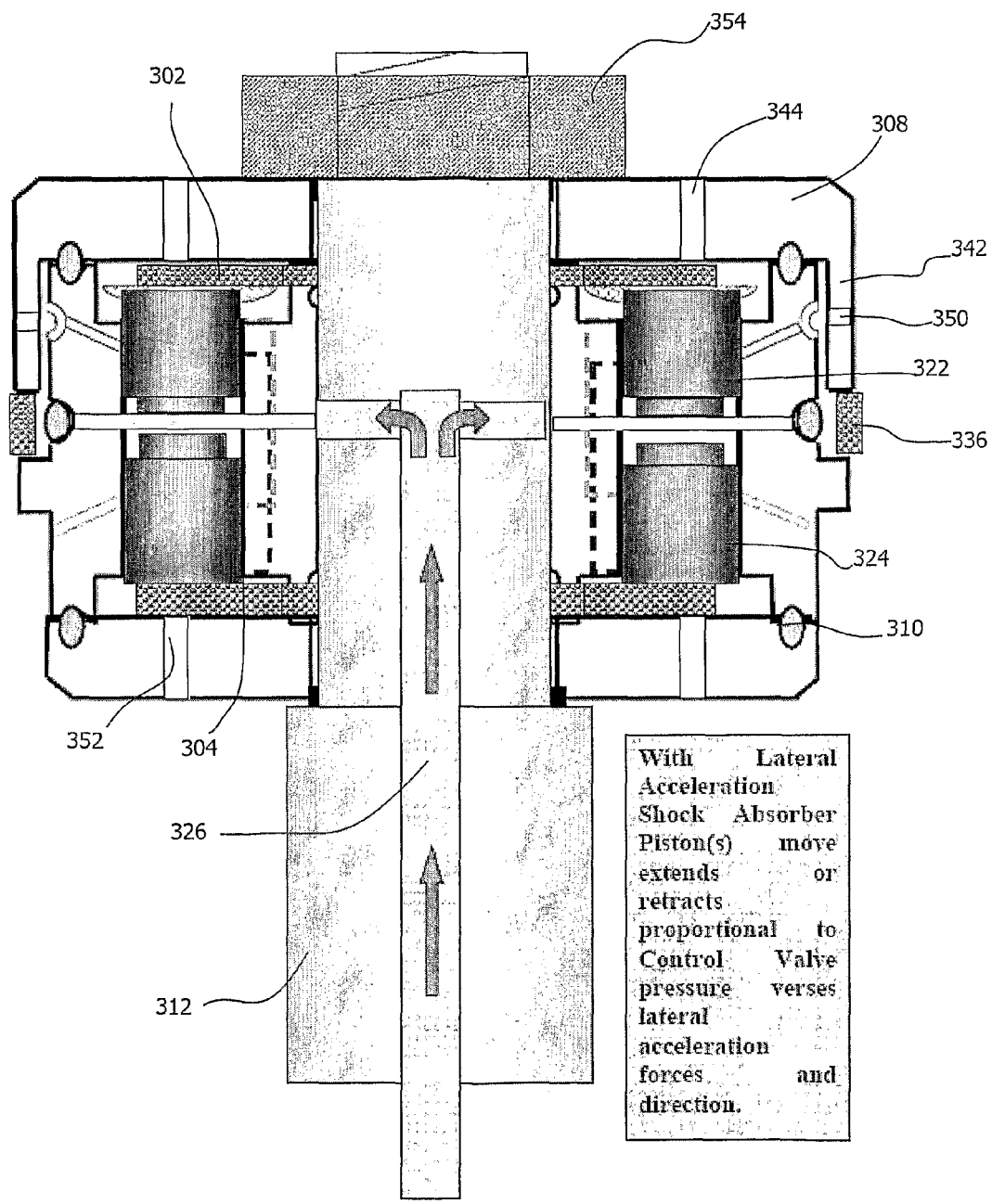
FIG. 33 is a cross-sectional view of the main piston of FIG. 29, showing operation of the main piston during lateral acceleration of the vehicle.

As there is no spring or other resilient means between the opposed pairs of pressure relief pistons 322, 324, the pressure relief pistons 322, 324 are located together in direct abutment as shown in FIG. 32 when the vehicle experiences substantially nil lateral acceleration. With reference to FIG. 33, the pressure relief pistons 322, 324 move apart toward the respective sealing members 302, 304 in response to an increase in the control pressure as lateral acceleration of the vehicle increases. FIG. 32 shows a bump cycle of the vehicle with no lateral acceleration (ie. when the vehicle is travelling along a bumpy road in a straight line). As can be seen, the upper sealing member 302 transiently displaces away from the inner surface 314 of the upper part 308, so as to allow flow of fluid from the upper working chamber 65 to the lower working chamber 67, via a first damping duct 328. Conversely, with reference to FIG. 34, when the vehicle experiences a rebound cycle with no lateral acceleration (ie. when the vehicle drives over a pothole in a straight line), the lower sealing member 304 transiently displaces away from the inner surface 316 of the lower part 310 to allow flow of fluid from the lower working chamber 67 to the upper working chamber 65 through a second damping duct 330. With reference to FIG. 33, with lateral acceleration, the pressure relief pistons 322, 324 move apart in response to the increase in the control pressure, so as to provide increased hardness of shock absorption when driving around corners. In this drawing, no transient increases in fluid pressure in the upper or lower working chambers 65, 67 are experienced, such that the upper and lower sealing members 302, 304 are in their sealing configurations against the upper and lower parts 308, 310, respectively.

Each of the pressure relief pistons 322, 324 has an abutting surface 332 of reduced cross-section, such that the abutting surfaces 332 are spaced from a wall 334 of the internal cylinder 320 to allow the fluid from the control duct 336 to act on the pressure relief pistons 322, 324 to drive the pistons 322, 324 outwardly one away from the other.

The main piston 300 is provided with a piston ring 336 for sealing of the upper and lower working chambers 65, 67 against a wall of the ram cylinder 52, and the control duct 326 is arranged to supply fluid at the control pressure to an inner surface 338 of the piston ring 336 so as to assist in ensuring sealing contact between the piston ring 336 and the ram cylinder 52. The control duct 326 supplies fluid to the inner surface 338 of the piston ring 336 via the internal cylinder 320, and, when the pressure relief pistons 322, 324 are together in direct abutment (as shown in FIG. 32), around the pressure relief pistons 322, 324 through a passage 340 provided by the reduced cross-section of the abutting surfaces 332. Accordingly, the working fluid is able to be supplied to the piston ring 336 irrespective of whether the pressure relief pistons 322, 324 are together in direct abutment or apart.

Figure 34:
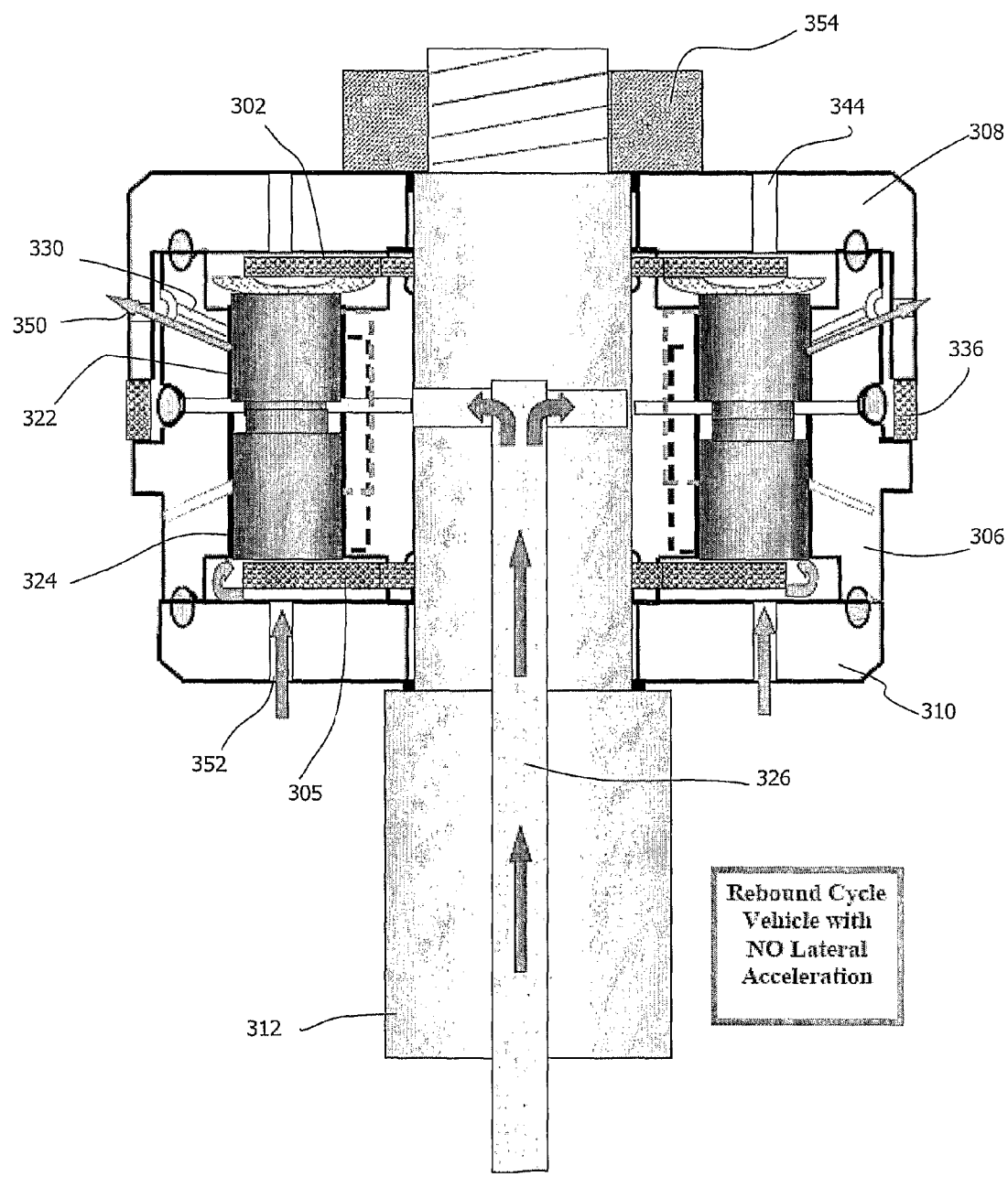
FIG. 34 is a cross-sectional view of the main piston, showing operation of the main piston during a transient increase in fluid pressure beneath the main piston.
Figure 35:
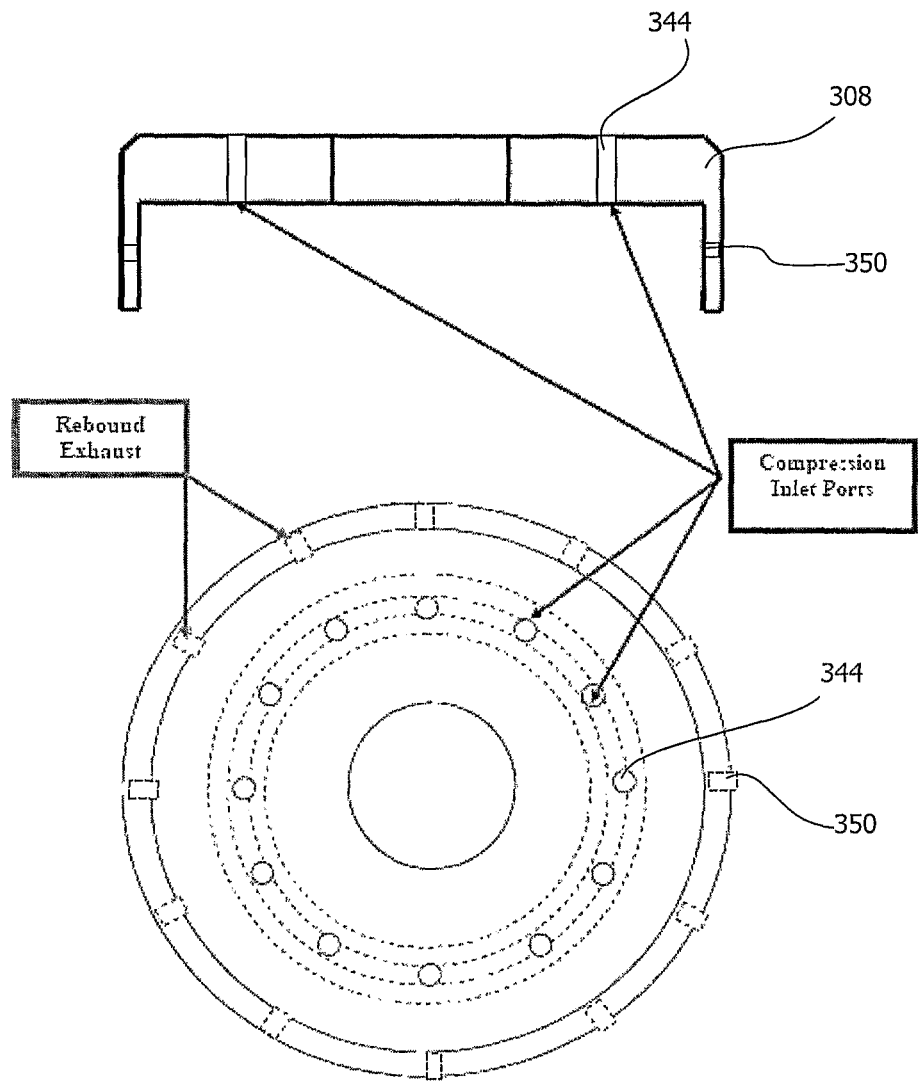
FIG. 35 shows side cross-sectional and top views of an upper part of the main piston of FIG. 29.

As shown in FIG. 35, the upper part 308 has a rim 342, and apertures 344 in an upper surface 346 thereof to allow direct communication between the upper working chamber 65 and the upper sealing member 302. The upper part 308 is fitted in sleeve arrangement over the main body 306, as shown in FIG. 29, and the rim 342 terminates in an edge 346 which is located in situ so as to hold the piston ring 336 against a circumferential ledge 348 of the main body 306. Accordingly, the main piston 300 is easy to assemble by virtue of its three main parts which are placed on the piston rod 312 in the order of the lower part 310, main body 306 and upper part 308, with the piston ring 336 being fitted about the main body 306 prior to sleeved fitting of the upper part 308 over the main body 306. Also with reference to FIG. 35, the rim is provided with side apertures 350 which communicate with the second damping duct 330, as shown in FIG. 34.

Figure 38:
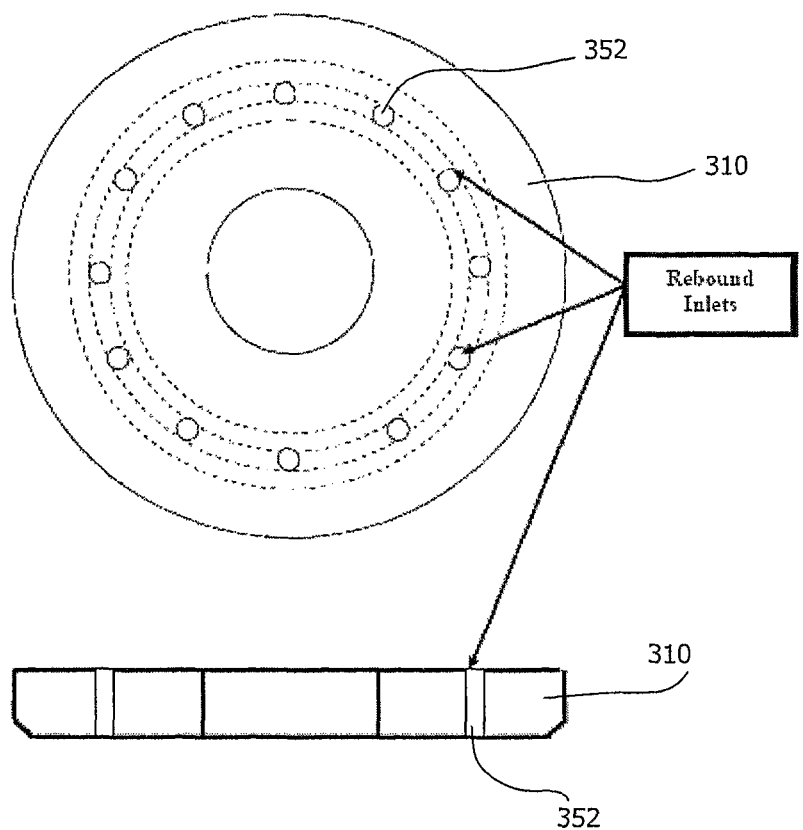
FIG. 38 shows bottom and side cross-sectional views of a lower part of the main piston of FIG. 29.

With reference to FIG. 38, the lower part 310 has apertures 352 in a lower surface thereof to allow direct communication between the lower working chamber 67 and the lower sealing member 304. The apertures 344, 352 of the upper and lower parts 308, 310 are arranged in an evenly spaced annular configuration about a central axis of the ram, so as to facilitate even distribution of pressure on the upper and lower sealing members 302, 304.

Figure 36:
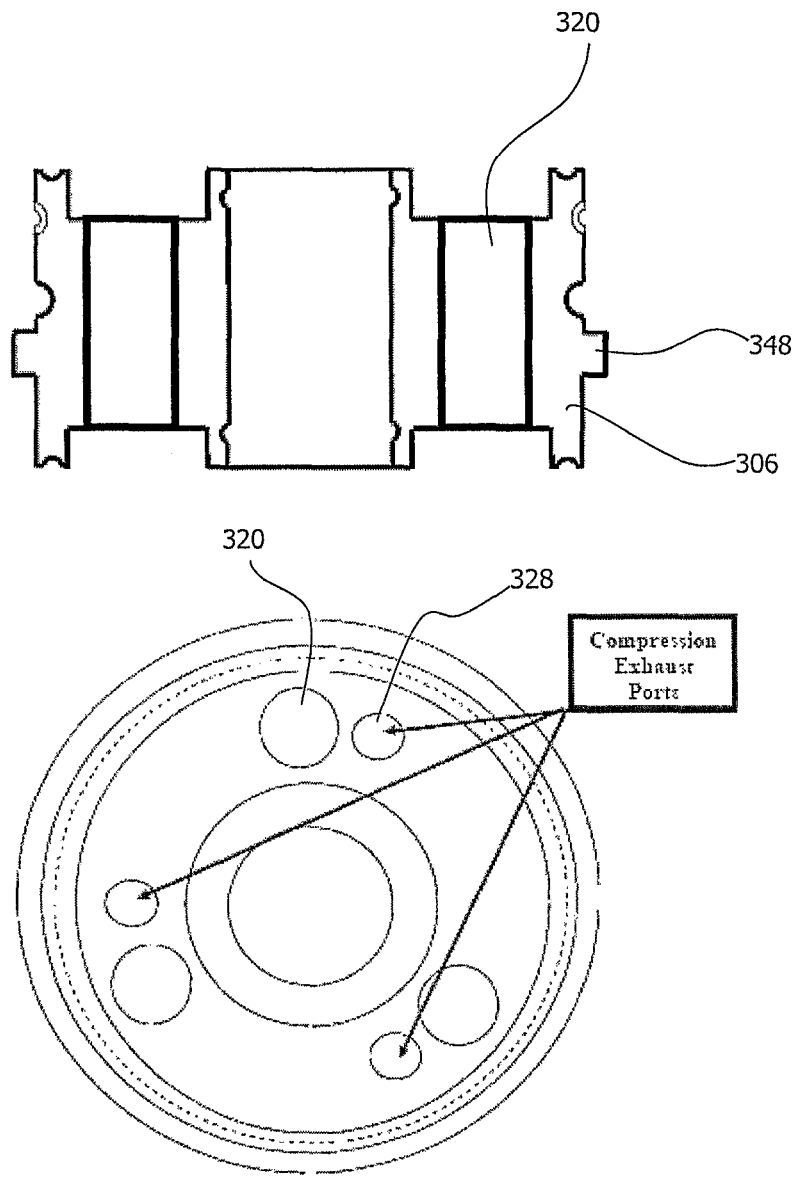
FIG. 36 shows side cross-sectional and top views of a main body of the main piston of FIG. 29.
Figure 37:
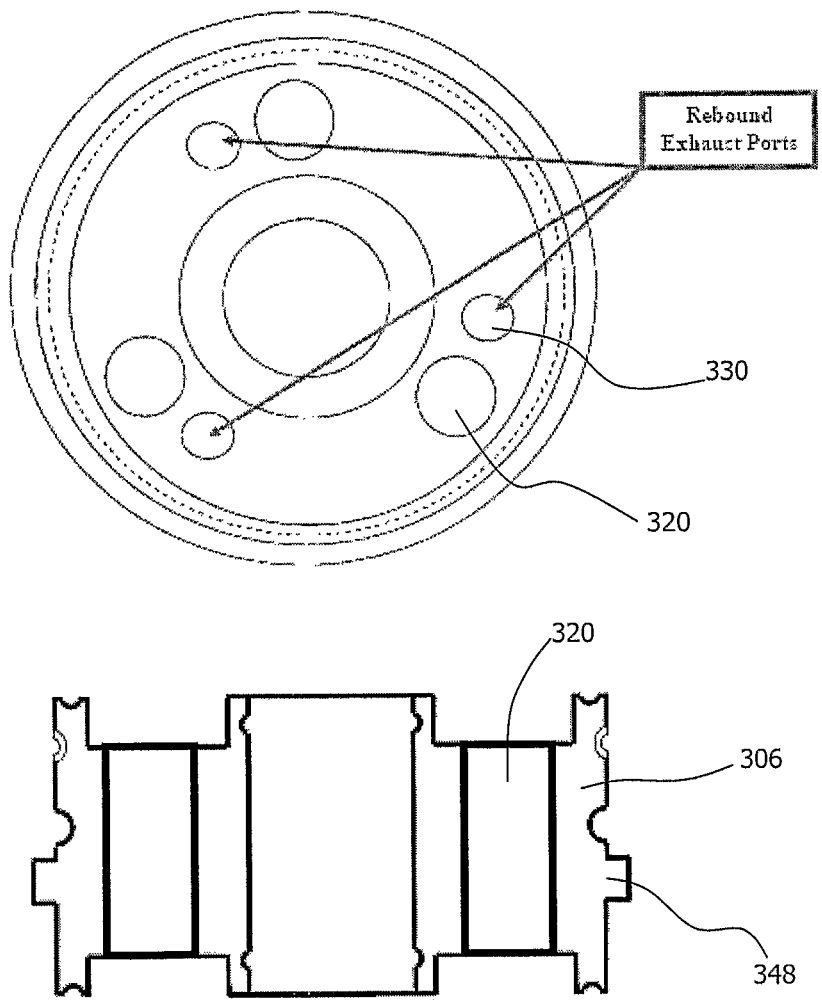
FIG. 37 shows underside and side cross-sectional views of the main body shown in FIG. 36.

With reference to FIGS. 36 and 37, the main body 306 is provided with three each of internal cylinders 320, first damping ducts 328, and second damping ducts 330. The internal cylinders 320, first damping ducts 328 and second damping ducts 330 are each evenly spaced around the central axis of the ram. The first damping ducts 328 provide permanent communication between the upper sealing member 302 and the lower working chamber 67, and the second damping ducts 330 provide permanent communication between the lower sealing member 304 and the upper working chamber 65. Accordingly, there is no need for a piston biased by a spring to be overcome by the fluid pressure to establish such communication, thus resulting in more instantaneous reaction to transient increases in fluid pressure in the upper and lower working chambers 65, 67.

Figure 39:
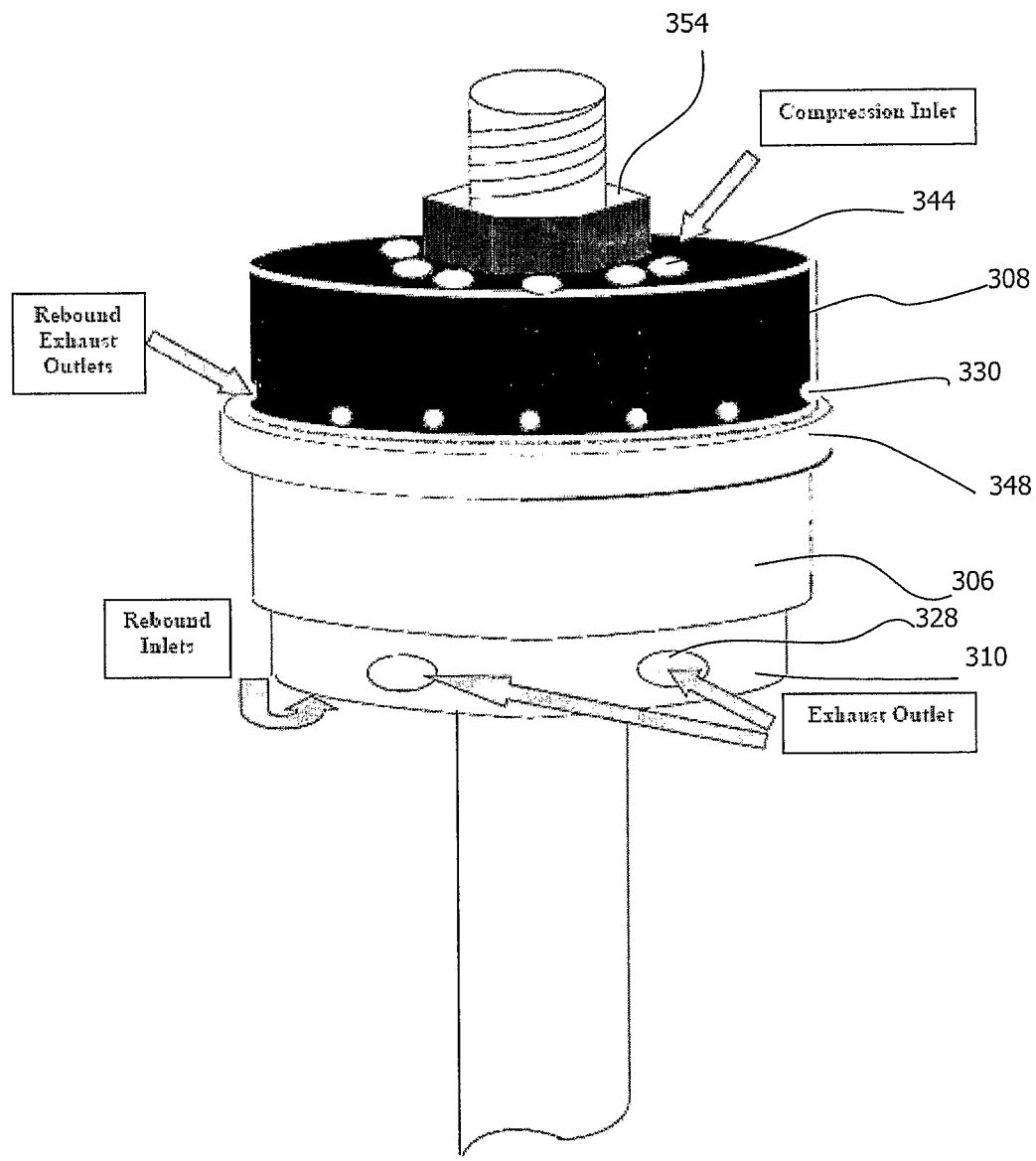
FIG. 39 shows a perspective schematic view of the main piston of FIG. 29.

With reference to FIG. 39, the main piston 300 is shown as mounted to the piston rod 312 by way of a nut 354 which is tightened onto the upper surface of the upper part 308 so as to compress the three parts of the main piston 300 together. This drawing shows the apertures 344 which serve as the compression inlet, side apertures 350 which serve as rebound exhaust outlets of fluid flowing through the second damping ducts 330, and exhaust outlets of the first damping ducts 328. The apertures 352 on the lower face of the lower part 310 act as rebound inlets for allowing direct communication of fluid in the lower working chamber 67 against the lower surface of the lower sealing member 304.

Figure 40:
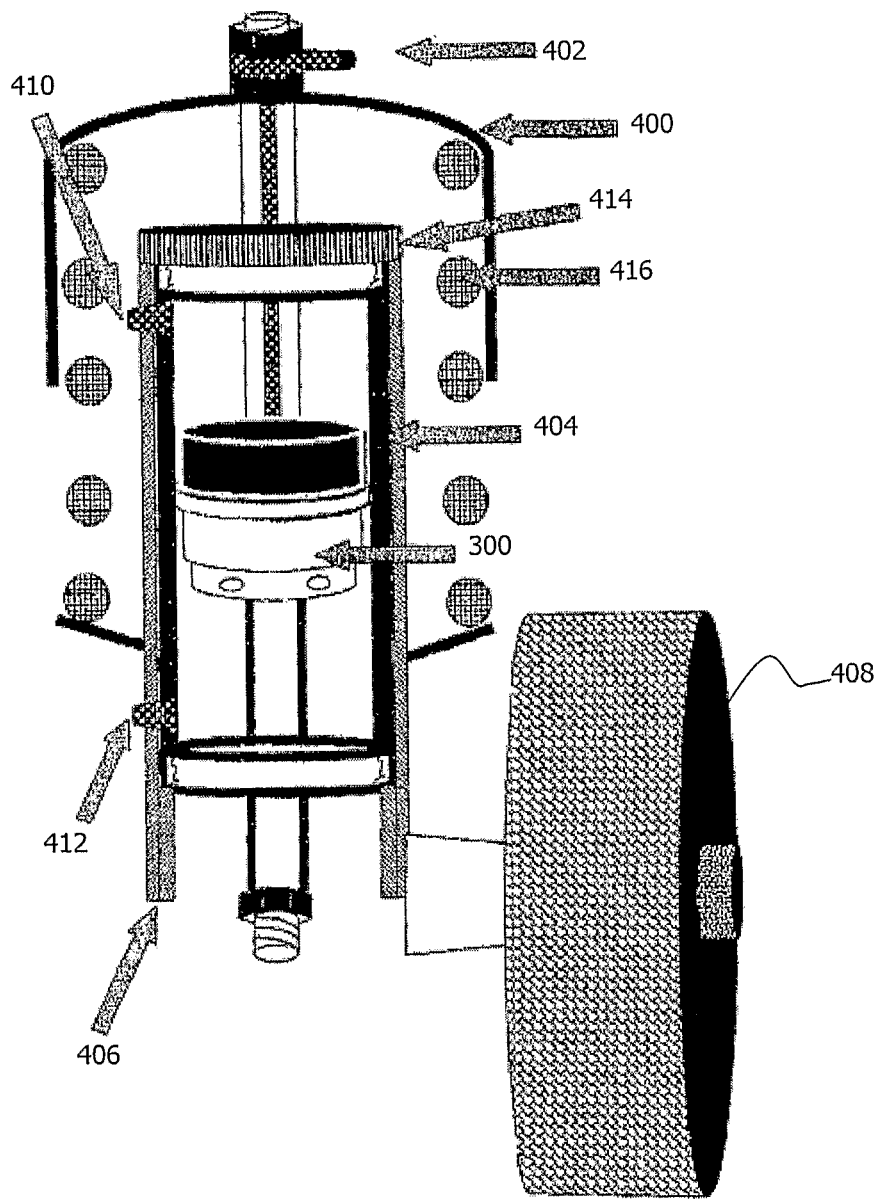
FIG. 40 is a simplified cross-sectional view through a ram in accordance with an alternative embodiment.

FIG. 40 shows an alternative configuration for mounting the fluid operated ram in a suspension system of a vehicle using McPherson strut type suspension. The ram is arranged in a cartridge for use with the McPherson strut type vehicle suspension, and differs from the arrangement shown in FIG. 5 in that the main piston is coupled to a piston rod 312 which is fixed to a suspension tower 400. Oil is fed to the piston 300 through an upper section of the piston rod 312 by a balance oil line 402. The main piston 300 is mounted for movement within the cartridge 404 which is sleeved inside a strut housing 406. The strut housing 406 is coupled to a wheel 408 mounting assembly of the vehicle such that movement of the main piston 300 within the cartridge 404 results in movement of the wheel 408 relative to a chassis of the vehicle. A rebound port 410 and compression port 412 are formed in a side wall of the cartridge 404 and the strut housing 406. A strut lock nut 414 is located at an upper end of the strut housing 406, and a spring 416 is interposed between the suspension tower 400 and a bearing portion fixed to the strut housing 406 to provide resilience between these parts. Advantageously, as the piston rod 312 extends in both directions from the main piston 300, the main piston 300 has an equal surface area in contact with the upper and lower working chambers of the ram. Due to this arrangement of equal upper/lower surface areas of the main piston, the sum of the volumes of the upper and lower working chambers is constant throughout the range of travel of the main piston within the cylinder.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Many modifications will be apparent to those skilled in the art without departing from the spirit and scope of the invention.

The claims defining the invention are as follows:

1. An active suspension system for a vehicle including at least one fluid operated ram having a cylinder and a main piston mounted therein for reciprocating movement, control means for controlling an equilibrium position of the piston in the ram in response to lateral acceleration of the vehicle in order to counter the effects of body roll of the vehicle, the ram including shock absorbing means including upper and lower internal sealing members mounted within the main piston for permitting rapid movement of the piston from said equilibrium position when operating fluid in the ram is subjected to transient increases in pressure, wherein the main piston includes a main body, and upper and lower parts fitted to the main body, the upper internal sealing member fitted to rest in a sealing configuration against an inner surface of the upper part and being arranged such that an upper surface thereof is in direct communication with an upper working chamber above the main piston and a lower surface thereof is in direct communication with a lower working chamber below the main piston, the lower internal sealing member fitted to rest in a sealing configuration against an inner surface of the lower part and being arranged such that an upper surface thereof is in direct communication with the upper working chamber and a lower surface thereof is in direct communication with the lower working chamber, whereby a transient increase in pressure in the upper working chamber causes the upper internal sealing member to move away from said sealing configuration against the upper part to allow fluid to flow from the upper working chamber to the lower working chamber, and a transient increase in pressure in the lower working chamber causes the lower internal sealing member to move away from said sealing configuration against the lower part to allow fluid to flow from the lower working chamber to the upper working chamber, wherein the main piston is provided with an internal cylinder having a pair of opposed internal pressure relief pistons mounted for movement within the internal cylinder, wherein an upper one of the pressure relief pistons is adapted to exert pressure upwardly against the upper sealing member, and a lower one of the pressure relief pistons is adapted to exert pressure downwardly against the lower sealing member.

2. An active suspension system as claimed in claim 1, wherein the sealing members are in the form of diaphragms.

3. An active suspension system as claimed in claim 1, wherein a resilient means acts between the upper and lower internal sealing members to bias the sealing members toward their sealing configurations.

4. An active suspension system as claimed in claim 3, wherein the resilient means is in the form of a wave washer.

5. An active suspension system as claimed in claim 1, wherein the main piston is provided with a control duct for supplying operating fluid at a control pressure between the upper and lower pressure relief pistons, and the control pressure is able to be varied to adjust a force exerted by the upper and lower pressure relief pistons against the upper and lower sealing members.

6. An active suspension system as claimed in claim 5, wherein the system is adapted such that the control pressure is increased with an increase in lateral acceleration of the vehicle so as to provide a harder rate of shock absorption during cornering.

7. An active suspension system as claimed in claim 6, wherein the upper and lower pressure relief pistons are together in direct abutment when the vehicle experiences substantially nil lateral acceleration, and wherein the pressure relief pistons move apart toward the respective sealing members in response to an increase in the control pressure as lateral acceleration of the vehicle increases.

8. An active suspension system as claimed in claim 7, wherein each of the pressure relief pistons has an abutting surface of reduced cross-section, such that the abutting surfaces are spaced from a wall of the internal cylinder to allow the fluid from the control duct to act on the pressure relief pistons to drive the pistons outwardly one away from the other.

9. An active suspension system as claimed in claim 8, wherein the main piston is provided with a piston ring for sealing of the upper and lower working chambers against a wall of the ram cylinder, and wherein the control duct is arranged to supply fluid at the control pressure to an inner surface of the piston ring so as to assist in ensuring sealing contact between the piston ring and the ram cylinder.

10. An active suspension system as claimed in claim 9, wherein the control duct supplies fluid to the inner surface of the piston ring via the internal cylinder, and, when the pressure relief pistons are together in direct abutment, around the pressure relief pistons through a passage provided by the reduced cross-section of the abutting surfaces.

11. An active suspension system as claimed in claim 9, wherein the upper part is fitted in sleeved arrangement over the main body, and a rim of the upper part terminates in an edge which is located in situ so as to hold the piston ring against a circumferential ledge of the main body.

12. An active suspension system as claimed in claim 1, wherein the upper part has apertures in an upper surface thereof to allow direct communication between the upper working chamber and the upper sealing member, and wherein the lower part has apertures in a lower surface thereof to allow direct communication between the lower working chamber and the lower sealing member.

13. An active suspension system as claimed in claim 12, wherein the apertures are arranged in an evenly spaced annular configuration about a central axis of the ram.

14. An active suspension system as claimed in claim 1, wherein a first damping duct provides permanent communication between the upper sealing member and the lower working chamber, and a second damping duct provides permanent communication between the lower sealing member and the upper working chamber.

15. An active suspension system as claimed in claim 14, wherein the main piston is provided with a plurality of internal cylinders evenly spaced about the central axis of the ram, a plurality of first damping ducts evenly spaced about the central axis, and a plurality of second damping ducts evenly spaced about the central axis.

16. An active suspension system as claimed in claim 15, wherein the main piston is provided with three each of internal cylinders, first damping ducts, and second damping ducts.

17. An active suspension system as claimed in claim 1, wherein said at least one ram includes coupling means to couple the ram between the vehicle chassis and an axle assembly thereof and wherein said at least one ram constitutes a shock absorber for the suspension system.

18. An active suspension system as claimed in claim 17 wherein the vehicle has a plurality of wheels each being connected to the vehicle chassis by one of said axle assemblies and wherein one of said rams is coupled between the vehicle chassis and respective axle assemblies.

19. An active suspension system as claimed in claim 18 wherein the vehicle is an automobile having front and rear driver side wheels and front and rear passenger side wheels and wherein there are front and rear driver side rams and front and rear passenger side rams and wherein the control means is operable to cause the driver side rams to simultaneously move to a first equilibrium position in one sense when the vehicle is cornering in one direction and to cause the passenger side rams to simultaneously move to a second equilibrium position in another sense, opposite to said one sense, when the vehicle is cornering in another direction, opposite to said one direction.

20. A vehicle having an active suspension system as defined in claim 1.

21. An hydraulic ram which can be used as an adjustable shock absorber, said ram having a cylinder, a main piston mounted on a piston rod and defining upper and lower working chambers in the cylinder; the ram including shock absorbing means including upper and lower internal sealing members mounted within the main piston for permitting rapid movement of the piston from said equilibrium position when operating fluid in the ram is subjected to transient increases in pressure, wherein the main piston includes a main body, and upper and lower parts fitted to the main body, the upper internal sealing member fitted to rest in a sealing configuration against an inner surface of the upper part and being arranged such that an upper surface thereof is in direct communication with the upper working chamber above the main piston and a lower surface thereof is in direct communication with the lower working chamber below the main piston, the lower internal sealing member fitted to rest in a sealing configuration against an inner surface of the lower part and being arranged such that an upper surface thereof is in direct communication with the upper working chamber and a lower surface thereof is in direct communication with the lower working chamber, and wherein a control fluid duct is provided in said piston rod in communication with passages in the main piston to provide fluid communication between said fluid control duct and upper and lower pressure relief pistons mounted within an internal cylinder of the main body to exert sealing force against the upper and lower sealing members, wherein the arrangement is such that hydraulic fluid supply means can be used to supply operating fluid at a high pressure and a low pressure to said upper and lower working chambers whereby the pressure difference across the main piston enables the ram to support a load and wherein the high pressure is, in use, applied to said control fluid duct so that the upper and lower sealing members are in a sealed configuration but, if a transient increase of fluid pressure is caused in the upper working chamber the upper internal sealing member is transiently displaced from said sealing configuration against the upper part to allow fluid to flow from the upper working chamber to the lower working chamber, and if a transient increase of fluid pressure is caused in the lower working chamber the lower internal sealing member is transiently displaced from said sealing configuration against the lower part to allow fluid to flow from the lower working chamber to the upper working chamber.

22. A vehicle having an active suspension system including a fluid operating ram, wherein the fluid operated ram thereof comprises a hydraulic ram as defined in claim 21.

* * * * *